(12) United States Patent
Edathil et al.

(10) Patent No.: US 12,248,743 B2
(45) Date of Patent: Mar. 11, 2025

(54) CELL ARCHITECTURE WITH BACKSIDE POWER RAILS

(71) Applicant: Arm Limited, Cambridge (GB)

(72) Inventors: Sharath Koodali Edathil, Austin, TX (US); Marlin Wayne Frederick, Jr., Austin, TX (US)

(73) Assignee: Arm Limited, Cambridge (GB)

( * ) Notice: Subject to any disclaimer, the term of this patent is extended or adjusted under 35 U.S.C. 154(b) by 11 days.

(21) Appl. No.: 17/685,166

(22) Filed: Mar. 2, 2022

(65) Prior Publication Data

US 2022/0188496 A1 Jun. 16, 2022

Related U.S. Application Data

(62) Division of application No. 17/091,229, filed on Nov. 6, 2020, now Pat. No. 11,836,432.

(51) Int. Cl.
*G06F 30/398* (2020.01)
*G06F 30/327* (2020.01)
(Continued)

(52) U.S. Cl.
CPC .......... *G06F 30/373* (2020.01); *G06F 30/327* (2020.01); *G06F 30/394* (2020.01); *G06F 30/398* (2020.01)

(58) Field of Classification Search
CPC .. G06F 30/392; G06F 30/394; G06F 2119/06; G06F 30/327; G06F 30/373; G06F 30/398; G06F 40/30; G06F 30/39; G06F 2119/18; G06F 13/1668; G06F 30/396; G06F 30/367; G06F 1/26; G06F 13/1694; G06F 2113/04; G06F 2115/12; G06F 2119/12; G06F 30/3953; G06F 1/263; G06F 1/28; G06F 1/3206; G06F 1/3243; G06F 1/3287; G06F 1/3296; G06F 16/9538; G06F 16/9577; G06F 2111/04; G06F 2117/10; G06F 3/04847; G06F 30/3312; G06F 30/3315; G06F 11/3006; G06F 11/3027; G06F 11/3051; G06F 16/955; G06F 16/9566; G06F 16/9574; G06F 16/958; G06F 2113/18; G06F 9/455; H01L 2027/11881; H01L 23/5286; H01L 27/0207; H01L 23/481; H01L 23/528; H01L 2027/11875; H01L 2224/48227; H01L 21/8221; H01L 29/66439;
(Continued)

(56) References Cited

U.S. PATENT DOCUMENTS

2012/0286858 A1* 11/2012 Biggs .................. G06F 30/39
716/120
2015/0347665 A1 12/2015 Sapatnekar et al.
(Continued)

*Primary Examiner* — Binh C Tat
(74) *Attorney, Agent, or Firm* — Pramudji Law Group PLLC; Ari Pramudji

(57) ABSTRACT

Various implementations described herein refer to a method. The method may be configured to synthesize standard cells for a physical design having a power supply net with power supply rails. The method may be configured to employ a place-and-route tool so as to define edge-types for each standard cell of the standard cells in the physical design based on the power supply net and the power supply rails that touch at least one edge of each standard cell of the standard cells.

20 Claims, 19 Drawing Sheets

(51) Int. Cl.
*G06F 30/373* (2020.01)
*G06F 30/394* (2020.01)

(58) Field of Classification Search
CPC ............. H01L 2924/14; H01L 23/5283; H01L 2224/48195; H01L 2224/73267; H01L 2224/73204; H01L 2224/16227; H01L 2224/16235; H01L 2224/49176; H01L 23/5386; H01L 25/16; H01L 25/18; H01L 21/823475
USPC ................................................. 716/106–115
See application file for complete search history.

(56) References Cited

U.S. PATENT DOCUMENTS

| | | |
|---|---|---|
| 2017/0235865 A1 | 8/2017 | Preuthen et al. |
| 2018/0013432 A1 | 1/2018 | Klass |
| 2018/0374791 A1* | 12/2018 | Smith ............... H01L 21/76224 |
| 2019/0148284 A1* | 5/2019 | Aipperspach ........... G06F 30/30 716/120 |
| 2020/0042667 A1* | 2/2020 | Swaminathan ....... G06F 30/392 |
| 2020/0373241 A1* | 11/2020 | Gerousis ............. H01L 23/5226 |

* cited by examiner

500D

BPDN Architecture 504D

Primary Power Supply (PPWR)
Secondary Power Supply (SPWR)

CELL ARCHITECTURE WITH BACKSIDE POWER RAILS

CROSS-REFERENCE TO RELATED APPLICATION

This application is a divisional application of and claims priority to U.S. patent application Ser. No. 17/091,229 filed 2020 Nov. 6, the entire disclosure of which is herein incorporated by reference in its entirety.

BACKGROUND

This section is intended to provide information relevant to understanding various technologies described herein. As the section's title implies, this is a discussion of related art that should in no way imply that it is prior art. Generally, the related art may or may not be considered prior art. It should therefore be understood that any statement in this section should be read in this light, and not as any admission of prior art.

In semiconductor design, standard cells often include transistors and interconnect structures to realize various digital circuits that serve logical functions of a design. Standard cell layouts refer to a physical representation of digital circuits that are used in different forms in circuit designs using electronic design automation (EDA) tools. Standard cells of different circuits and functions may be provided in a standard cell library, and standard cells may have characteristics for associating itself with the standard cell library. These characteristics along with design rules assist with placement in a design block, and each standard cell has power and ground supply rails at a fixed location relative to row boundaries of each row of standard cell. These power and ground rails provide primary supplies, and when these cells are placed in a block design, the power and ground rails of standard cells in a block are connected to a single power and ground net. Conventional EDA tools typically lack support for power rails and/or ground rails that connect to different power or ground nets in the same power/voltage domain. Also, some power supplies that are connected to standard cells pass-through metal pins and not through power/ground rails, and the design block that has standard cells needs to have continuous power/ground rails in a designated area for standard cells. As such, there exists a need to improve physical design layouts of standard cells.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Figure 1:
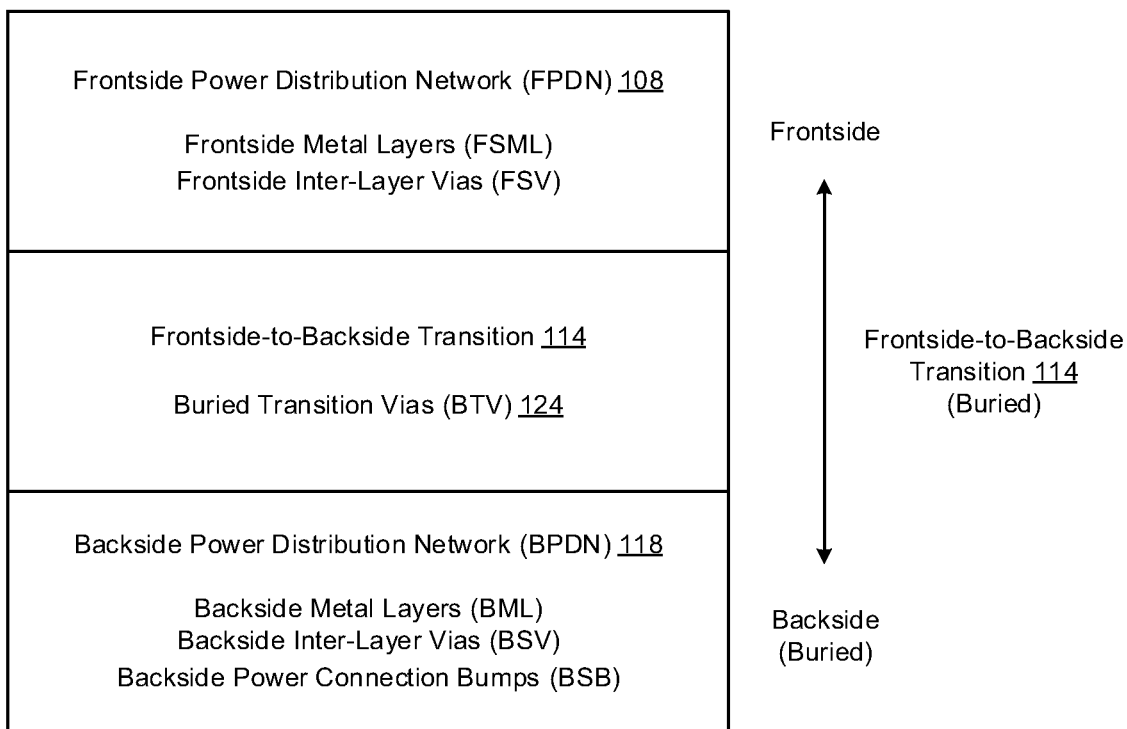
FIG. 1 illustrates a diagram of buried power rail (BPR) process technology for use in physical design in accordance with various implementations described herein.

Various implementations described herein relate to chip-level integrated circuit (IC) design schemes and techniques for implementing various efficient backside power supply and distribution methodologies in physical structures. The various schemes and techniques described herein may provide for heterogeneous rail integration in standard cell architecture with a backside power distribution network (BPDN). In various implementations, the breaking of backside power/ground rails may be achieved efficiently to connect standard cell frontside rails to secondary power/ground supply using various cell edge types and/or power gap cells with special filler cells. When building standard cells with various process technologies that allow for power/ground rails on the backside of a wafer, the backside rail may need a break in continuity so as to provide secondary power/ground to a standard cell or at least some part of the standard cell. The continuity break in the backside rail may reduce area overhead for breaking the backside rails by using automated placement rules and special cells, which may involve use of gap cells and special filler cells based on various defined edge types.

The various schemes and techniques described herein may be applied to various cell design processes that force power rail interruptions in primary rail structures by enabling heterogeneous rail integration in standard cell Place-and-Route (PNR) for some cell design processes that use interruptions in primary power rails. Some cell design methodologies and techniques may also incorporate single rail or multi-rail configurations, and some variations of multi-row cell designs may have additional access to primary supply rails and/or secondary supply rails. Some novel cell types may complement cell design techniques provided herein, and some power rail segments of the same net may have an affinity for each other and may be placed together in PNR to gain the benefit of various ideas provided herein.

The various schemes and techniques described herein may enable area efficient synthesis and place-and-route (PNR) process by utilizing specially-designed standard cell layouts, structures and methods for cell design processes when standard cells need to have electrically isolated structures, such as, e.g., different potential NWELLs, power supply rails coupled to a secondary supply in the cell design, which is different from the primary supply of the cell design. The various schemes and techniques described herein are predominantly applicable to semiconductor processes that support a backside power distribution network (BPDN) and has backside power rails (or buried power rails) that couple to transistors on the frontside through buried vias so as to interrupt the primary power rails and/or grounded rails and so as to insert a secondary power segment and/or ground rail segment. Also, the various schemes and techniques described herein may be applied to semiconductor processes that have frontside power rails to insert secondary rail segments by interrupting the primary power rails and so as to isolate NWELLs of different potentials in an area efficient manner. Different potentials may refer to a difference in voltage values and/or different supplies.

Various implementations of physical layout design techniques for backside power distribution will be described in detail herein with reference to FIGS. 1-8.

FIG. 1 illustrates a diagram 100 of buried power rail (BPR) process technology 104 for use in physical design in accordance with implementations described herein.

In various implementations, the BPR process technology 104 may be implemented with a system or a device having various integrated circuit (IC) components that are arranged and coupled together as an assemblage and/or combination of parts that provide for physical circuit design and/or related structures. In some instances, a method of designing, providing, fabricating and/or manufacturing a system and/or device using the BPR process technology 104 may involve use of various IC circuit components described herein to thereby implement various backside power distribution schemes and techniques associated therewith. The BPR process technology 104 may be implemented with various computing circuitry and/or related manufacturing components on a single chip structure, and the BPR process technology 104 may be implemented in various embedded systems for automotive, electronic, mobile, server and Internet-of-things (IoT) applications, including remote sensor nodes.

As shown in FIG. 1, the BPR process technology 104 may utilize frontside power network (FSPN) architecture 108 that is configured for memory applications, such as, e.g., power distribution for core memory arrays. In some instances, the frontside power network (FSPN) 108 may include frontside metal layers (FMLs) that supply core voltage in different power domains, wherein the power domains of the core voltage may refer to a primary power domain (PPWR) and/or secondary power domain (SPWR).

In some implementations, the frontside power network (FSPN) 108 may include various types of components, circuitry, and metals layers. For instance, the frontside power network (FSPN) 108 may include frontside power rails that are coupled to memory circuitry having, e.g., an array of bitcells arranged in columns and rows along with header logic and power-gating control logic. Also, in some instances, the frontside power network (FSPN) 108 may include any number (N) of frontside metal layers (FMLs) along with frontside inter-layer vias (FSV) that couple different FMLs together.

The BPR process technology 104 may also utilize backside power network (BSPN) architecture 118 that provides backside power distribution for memory applications, such as, e.g., in use with various memory control circuitry including column multiplexer circuitry, sense amplifier circuitry, powergate input/output circuitry, and/or powergate control circuitry. Also, the backside power network (BSPN) 118 may be configured to supply core voltage in different power domains, including, the primary power domain (PPWR) and/or the secondary power domain (SPWR) for the memory control logic that is disposed frontside. Further, the backside power distribution network (BSPN) 118 may be configured to supply different types of source voltages, including, e.g., core voltage, periphery voltage and/or ground.

In some implementations, the backside power network (BSPN) 118 may include one or more backside metal layers (BMLs) including, e.g., buried metal layers, that supply power in the multiple domains (PPWR, SPWR). Also, the backside power network (BSPN) 118 may have backside power rails along with backside inter-layer vias (BSV) that are formed with the backside metal layers (BMLs). The backside power network (BSPN) 118 may also include backside power connection bumps (BSB).

The BPR process technology 104 may also utilize frontside-to-backside transition architecture 114 with buried transition vias (BTV) that are used to couple the buried backside power network (BSPN) to the frontside power network (FSPN). In some instances, the buried transition vias (BTV) 124 may be configured to provide for a power transition between the backside power network (BSPN) 118 to the frontside power network (FSPN) 108. Therefore, the BPR process technology 104 may be configured for transitioning the backside power rails of the backside power network to the frontside power rails of the frontside power network so as to provide power taps to memory circuitry from the backside power network (BSPN). Also, the frontside-to-backside transition 114 may be referred to as buried transition architecture that may have backside-to-frontside transition cells along with the buried transition vias 124 that provide a coupling transition between the backside power network (BSPN) 118 and the frontside power network (FSPN) 108.

In some implementations, the backside power rail (BPR) technology 104 may be configured to operate as power distribution network architecture that utilizes backside buried metal in the backside power network (BSPN) for the backside power rails and also utilizes frontside metal of the frontside power network (FSPN) for the frontside power rails. Also, the frontside power network (FSPN) may use frontside metal, and the backside power network (BSPN) may use backside buried metal that is disposed underneath the frontside metal of the frontside power network (FSPN). Also, the transition architecture may refer to buried transition architecture disposed between the backside buried metal of the backside power network (BSPN) and the frontside metal of the frontside power network (FSPN).

In various implementations, the various schemes and techniques described herein may provide for power distribution network architecture for transitioning power from backside to frontside with buried power rails. Also, the power distribution network architecture may be configured to use backside buried metal for backside power rails and use frontside metal for frontside power rails. Also, in some instances, the power distribution network architecture may use header-based power tapping circuitry in multiple different voltage domains, such as, e.g., PPWR and SPWR, along with ground (GND). These aspects and various other features are described in greater detail herein below in reference to FIGS. 2-7E.

In reference to the buried power rail (BPR) process technology 104 of FIG. 1 for use in various physical designs, FIGS. 2-7E illustrate various physical layout patterns and diagrams that are associated with backside power distribution network (BPDN) architecture in accordance with various implementations described herein. In some implementations, the diagrams in FIGS. 2-7E show various BPDN cell architectures having power rail structures providing a source supply for primary power (PPWR), secondary power (SPWR) and ground (GND) along with a cell boundary (CB) and a useful span of device (USOD). Also, various diagrams in FIGS. 2-7E show the power rails having power rail interruptions (or rail breaks, or rail gaps) formed in reference to the primary power (PPWR) that allow for insertion of other power rails for secondary power (SPWR). Also, various diagrams in FIGS. 2-7E show the power rails having modifiable features, including, e.g., various different edge types, various different positional orientations and/or various adjoining configurations.

Figure 2:
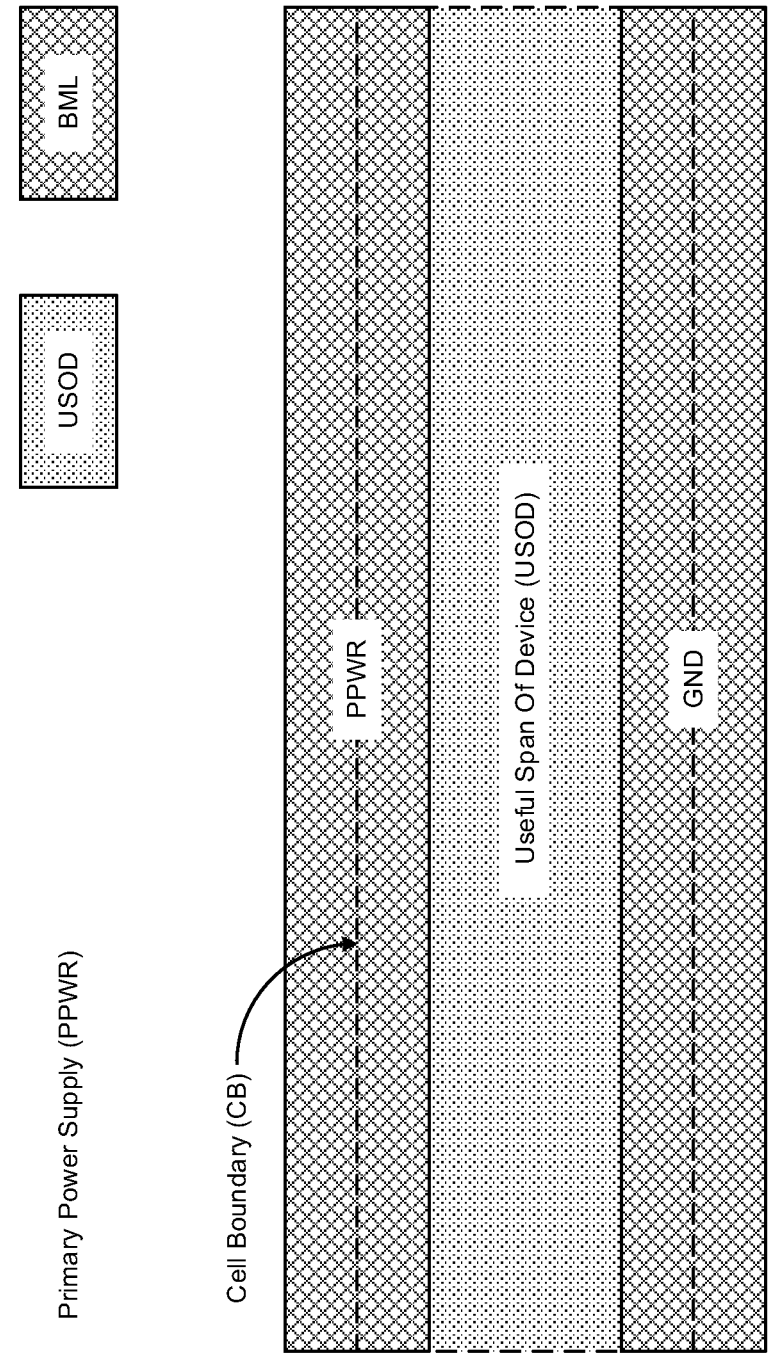
FIG. 2 illustrates a diagram associated with backside power distribution network (BPDN) architecture in accordance with various implementations described herein.

FIG. 2 illustrates a diagram 200 of backside power distribution network (BPDN) architecture 204 in accordance with implementations described herein.

As shown in FIG. 2, the BPDN architecture 204 may include a primary power rail (PPWR) that is coupled to the primary power (PPWR) and a grounded power rail (GND) that is coupled to ground (GND). The BPDN architecture 204 may refer to a cell architecture that has a cell boundary (CB) along with a useful span of device (USOD). In various instances, the cell architecture may refer to a standard cell architecture, and the cell boundary (CB) may refer to one or more areas that define the useful span of the device (USOD), which may be enclosed within the cell boundary (CB). The primary power rail (PPWR) and/or the grounded power rail (GND) may be formed with the same or different backside metal layers (BML).

Figure 3A:
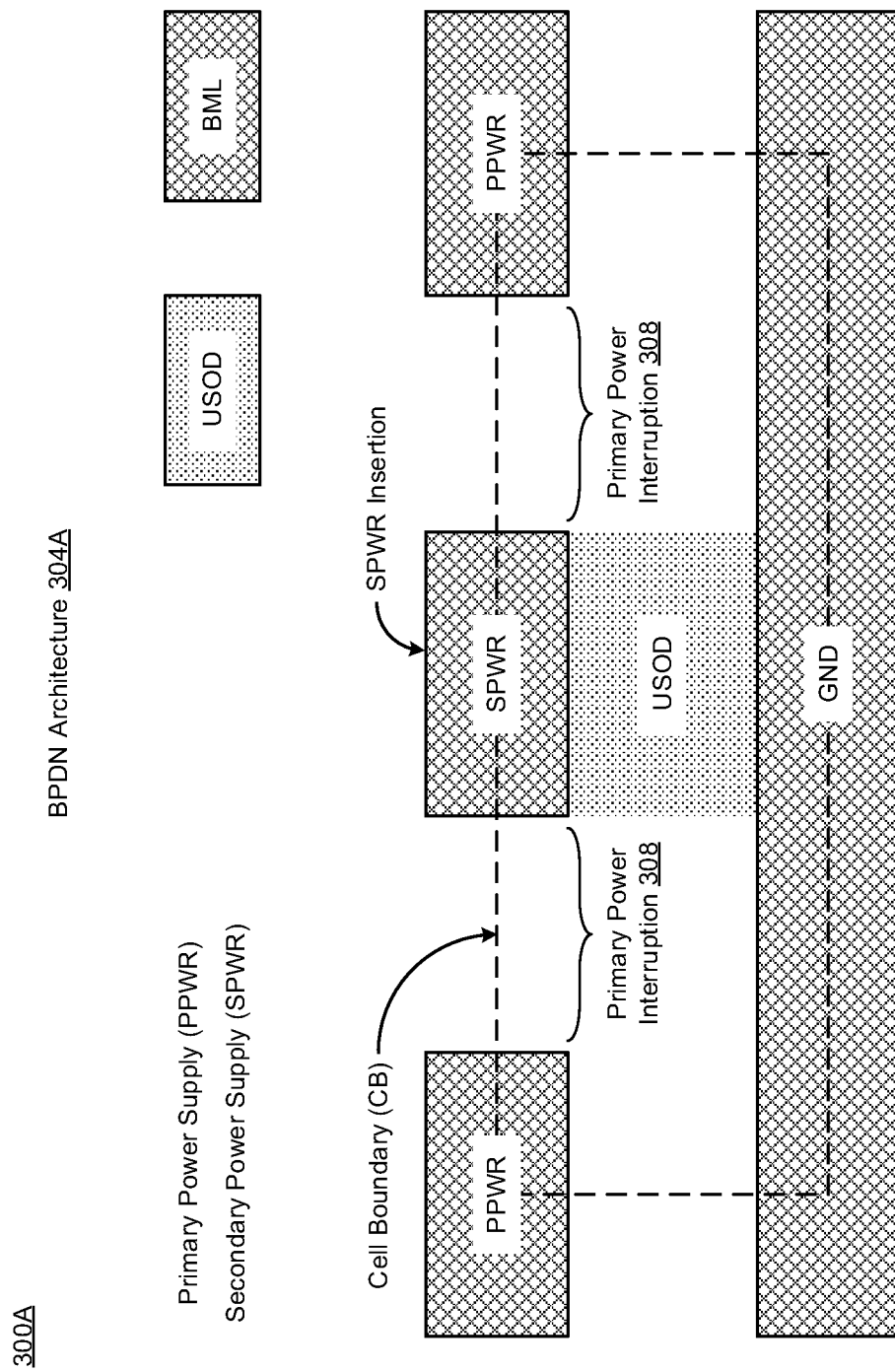
FIGS. 3A-3B illustrate other diagrams of BPDN architecture in accordance with various implementations described herein.
Figure 3B:
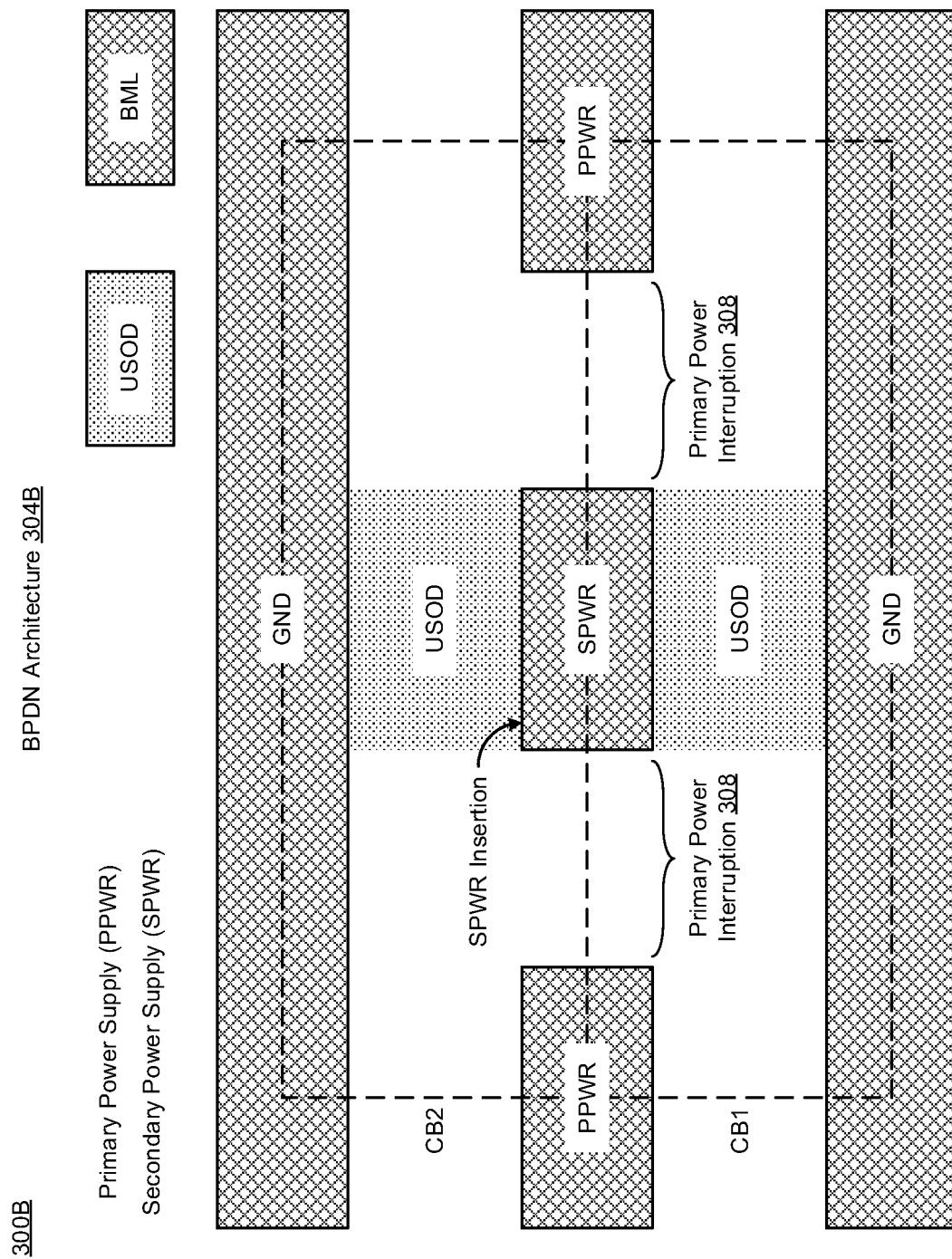

FIGS. 3A-3B illustrate other diagrams of BPDN architecture in accordance with various implementations described herein. In particular, FIG. 3A shows a diagram 300A of BPDN architecture 304A with primary power (PPWR) and secondary power (SPWR) in a single row, and FIG. 3B shows a diagram 300B of BPDN architecture 304B with primary power (PPWR) and secondary power (SPWR) in multiple rows.

As shown in FIG. 3A, the BPDN architecture 304A may have the primary power rail (PPWR) that is coupled to the primary power (PPWR) and the grounded power rail (GND) that is coupled to ground (GND). The BPDN architecture 304A may refer to a cell architecture having a cell boundary (CB) along with a useful span of device (USOD). In some instances, the primary power rail (PPWR) may be interrupted and a secondary power rail (SPWR) may be inserted in a gapped spatial interval defined by the primary power interruption 308. Also, the primary power rail (PPWR) provides a primary power supply (PPWR), and the secondary power rail (SPWR) provides a secondary power supply (SPWR). Also, in various instances, the primary power rail (PPWR), the secondary power rail (SPWR) and/or the grounded power rail (GND) may be formed with the same or different backside metal layers (BML).

In some implementations, the primary power interruption 308 provides the gapped spatial interval for insertion of the secondary power supply (SPWR). Also, in some instances, the primary power supply (PPWR) may be provided in a first power domain, such as, e.g., a core power domain (PPWR), and the secondary power supply (SPWR) may be provided in a second power domain, such as, e.g., a global core power domain (SPWR), that is different than the first power domain.

In some implementations, FIG. 3A represents a single row cell having secondary power supply (SPWR) with placement restrictions on an upper edge or north edge. Also, in other implementations, the grounded power rail (GND) may be interrupted (with a break or a gap), and the secondary power rail (SPWR) may be inserted in the gapped spatial interval defined by the interrupted ground rail (GND).

As shown in FIG. 3B, the BPDN architecture 304B may refer to a multi-row cell having a first row cell boundary (CB1) and a second row cell boundary (CB2) with secondary power supply (SPWR) having no placement restrictions on any edge. The BPDN architecture 304B may have the primary power rail (PPWR) that is coupled to the primary power (PPWR) and multiple grounded power rails (GND) that are coupled to ground (GND). Also, the BPDN architecture 304B may have multiple areas for the useful span of device (USOD). In various instances, the primary power rail (PPWR) may be interrupted and the secondary power rail (SPWR) may be inserted in the gapped spatial intervals that are defined by the primary power interruption 308. Also, the primary power rail (PPWR) may provide the primary power supply (PPWR), and the secondary power rail (SPWR) may provide the secondary power supply (SPWR). Also, the primary power rail (PPWR), the secondary power rail (SPWR) and/or the grounded power rail (GND) may be formed with the same or different backside metal layers (BML). Also, in other instances, the grounded power rails (GND) may be interrupted (with breaks or gaps), and the secondary power rail (SPWR) may be inserted in the gapped spatial intervals that are defined by the interrupted ground rails.

Figure 4A:
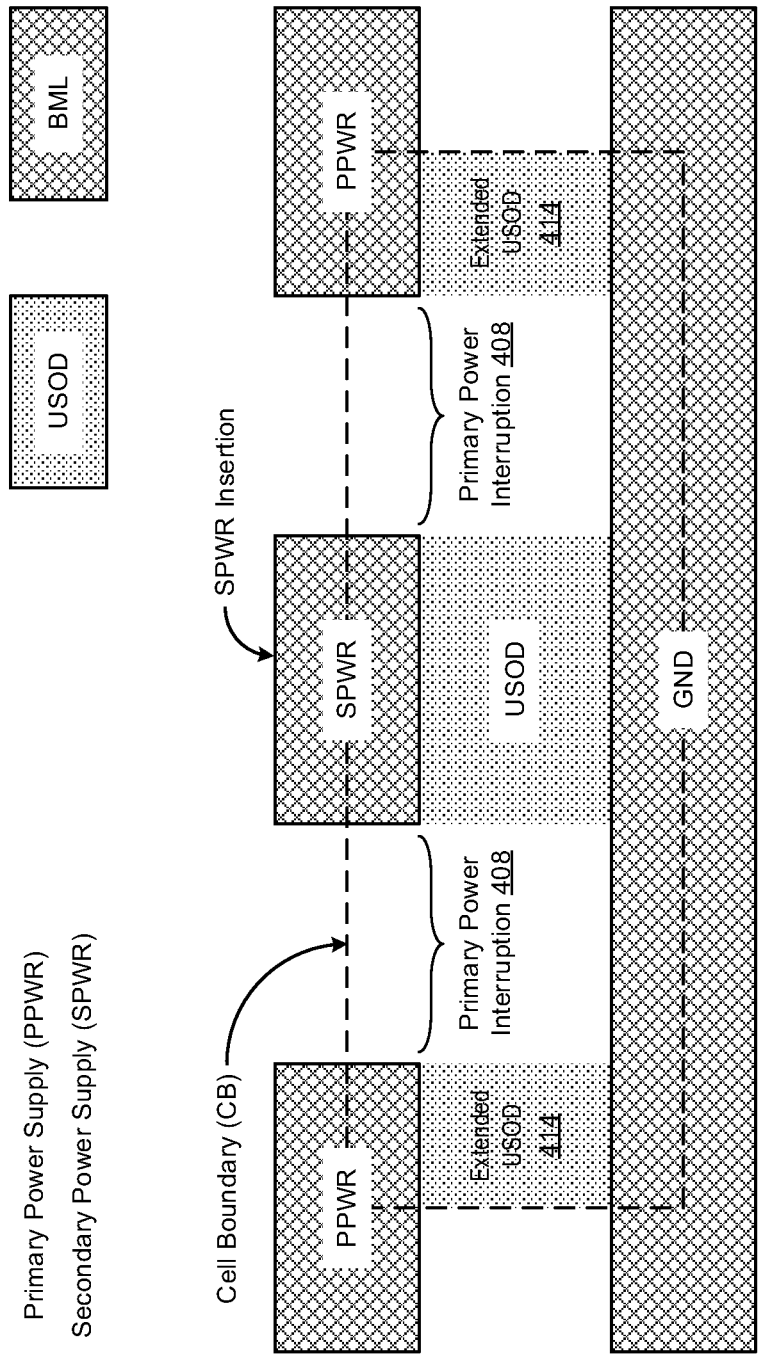
FIGS. 4A-4B illustrate other diagrams of BPDN architecture in accordance with various implementations described herein.
Figure 4B:
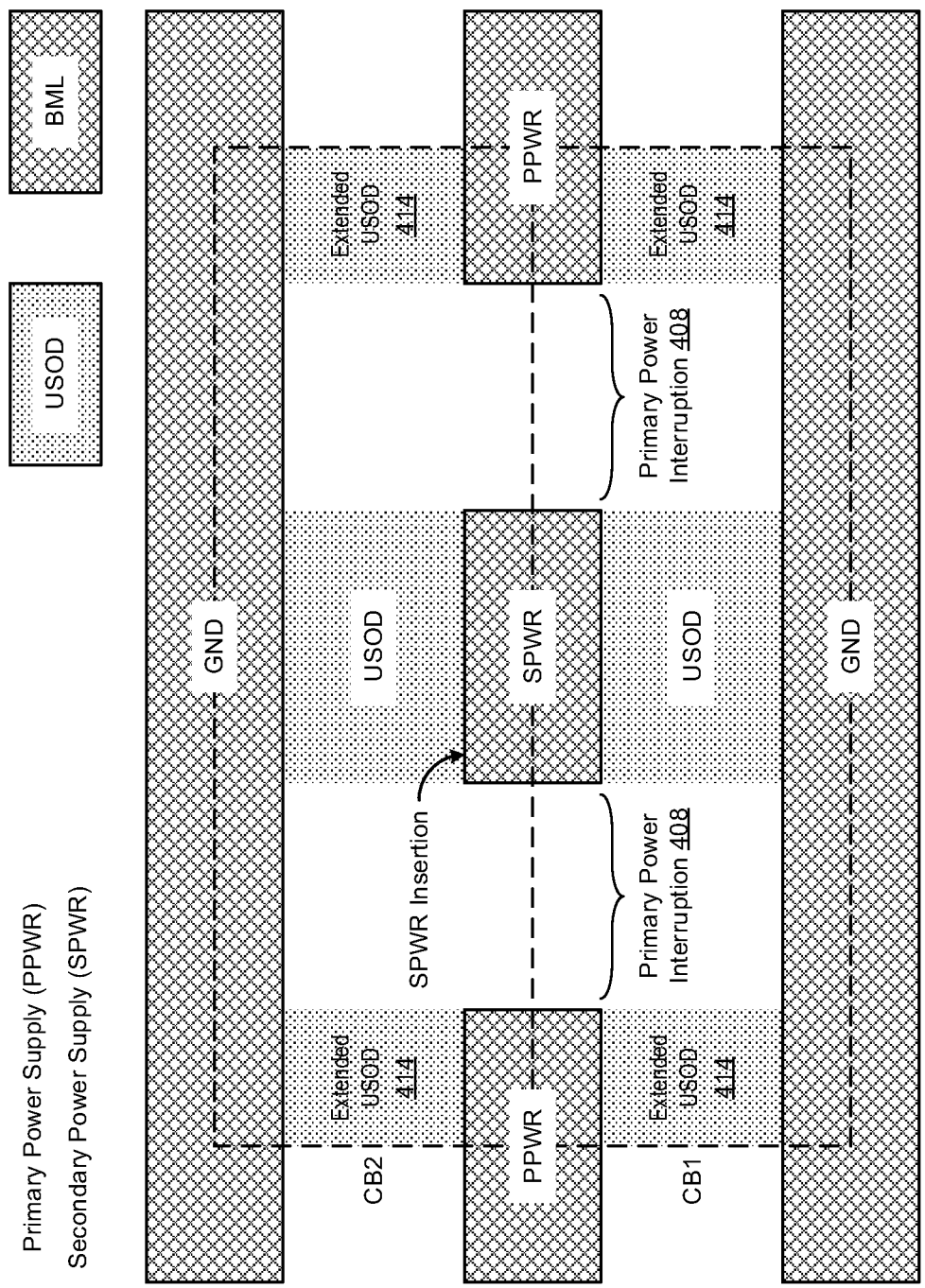

FIGS. 4A-4B illustrate other diagrams of BPDN architecture in accordance with various implementations described herein. In particular, FIG. 4A shows a diagram 400A of BPDN architecture 404A with primary power (PPWR) and secondary power (SPWR) in a single row, and FIG. 4B shows a diagram 400B of BPDN architecture 404B with primary power (PPWR) and secondary power (SPWR) in multiple rows.

As shown in FIG. 4A, the BPDN architecture 404A may have the primary power rail (PPWR) that is coupled to the primary power (PPWR) and the grounded power rail (GND) that is coupled to ground (GND). The BPDN architecture 404A may refer to a cell architecture having the cell boundary (CB) along with multiple areas defined for the useful span of device (USOD) including extended areas 414 for the USOD. In some instances, the primary power rail (PPWR) may be interrupted and the secondary power rail (SPWR) may be inserted in the gapped spatial intervals defined by the primary power interruptions 408. Also, the primary power rail (PPWR) provides a primary power supply (PPWR), and the secondary power rail (SPWR) provides the secondary power supply (SPWR). In various instances, the primary power rail (PPWR), the secondary power rail (SPWR) and/or the grounded power rail (GND) may be formed with the same or different backside metal layers (BML).

In some implementations, FIG. 4A may represent a single row cell with primary power (PPWR) and secondary power (SPWR) and placement restrictions on the upper edge or north edge. Also, FIG. 4A shows that the USOD may include multiple areas of extended use 414 (i.e., extended USOD) that may be enclosed within the cell boundary (CB). Also, in other implementations, the grounded power rail (GND) may be interrupted (with one or more breaks or gaps), and the secondary power rail (SPWR) may be inserted in the gapped spatial intervals defined by the interrupted ground rail.

As shown in FIG. 4B, the BPDN architecture 404B may refer to a multi-row cell having a first row cell boundary (CB1) and a second row cell boundary (CB2) with secondary power supply (SPWR) having no placement restrictions on any edge. The BPDN architecture 404B may have the primary power rail (PPWR) that is coupled to the primary power (PPWR) and multiple grounded power rails (GND) that are coupled to ground (GND). Also, the BPDN architecture 404B may have multiple areas for the useful span of device (USOD). In various instances, the primary power rail (PPWR) may be interrupted and the secondary power rail (SPWR) may be inserted in the gapped spatial intervals that are defined by the primary power interruption 408. Also, the primary power rail (PPWR) may provide the primary power supply (PPWR), and the secondary power rail (SPWR) may provide the secondary power supply (SPWR). Also, the primary power rail (PPWR), the secondary power rail (SPWR) and/or the grounded power rail (GND) may be formed with the same or different backside metal layers (BML). Also, in other instances, the grounded power rails (GND) may be interrupted (with one or more breaks or gaps), and the secondary power rail (SPWR) may be inserted in the gapped spatial intervals that are defined by the interrupted ground rails.

Figure 5A:
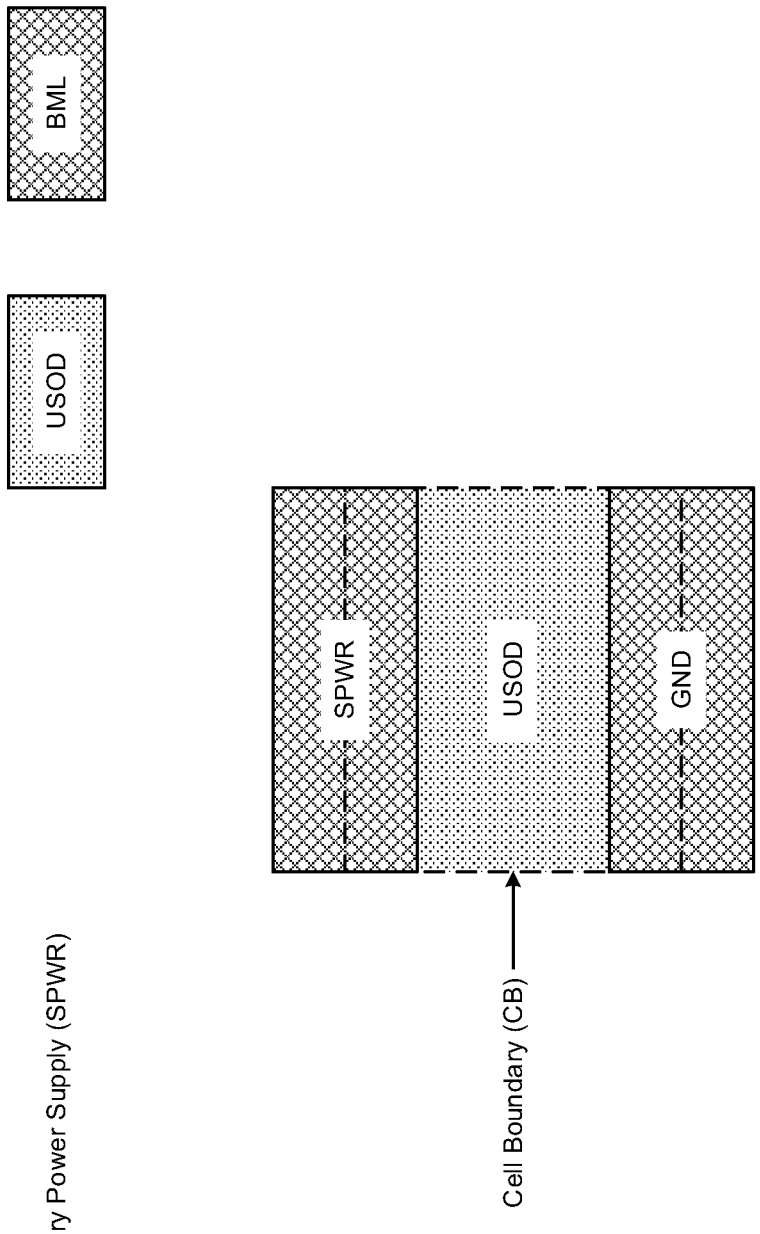
FIGS. 5A-5D illustrate other diagrams of BPDN architecture in accordance with various implementations described herein.
Figure 5A:
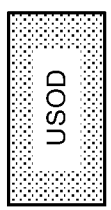
Figure 5A:
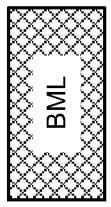
Figure 5B:
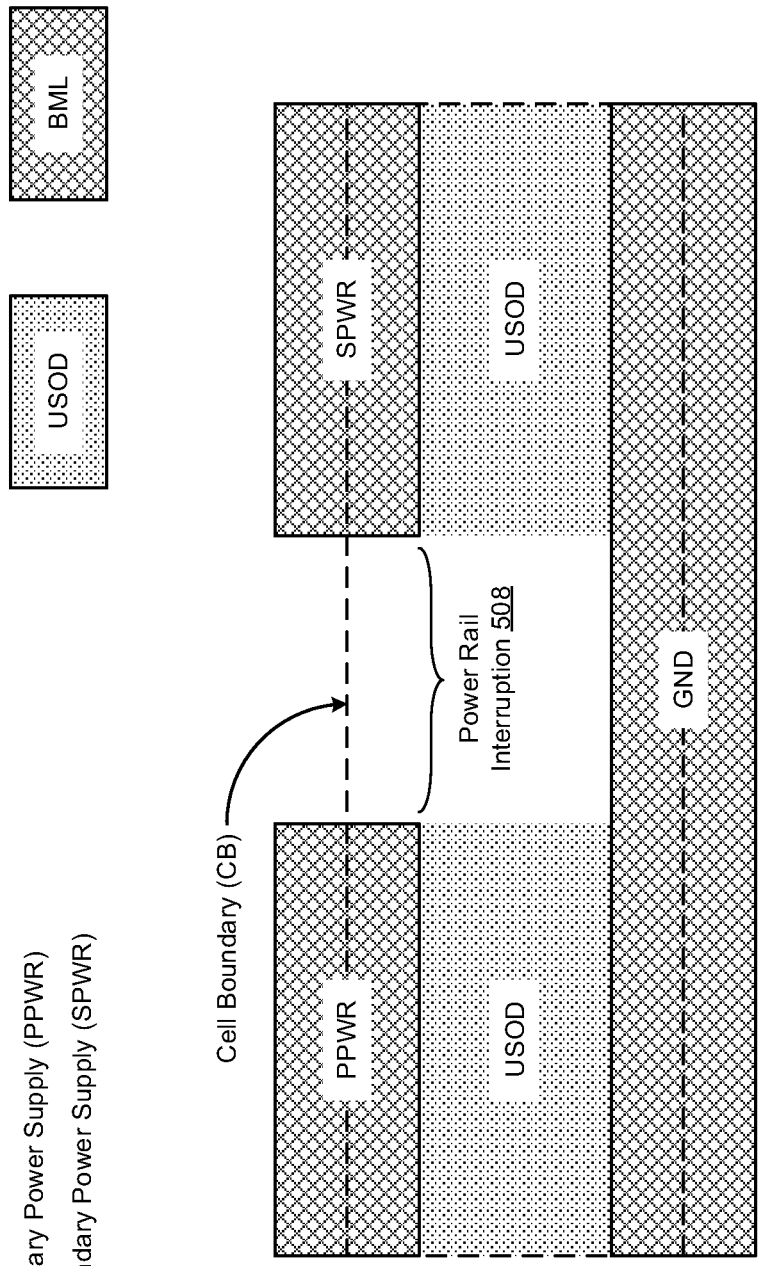
Figure 5C:
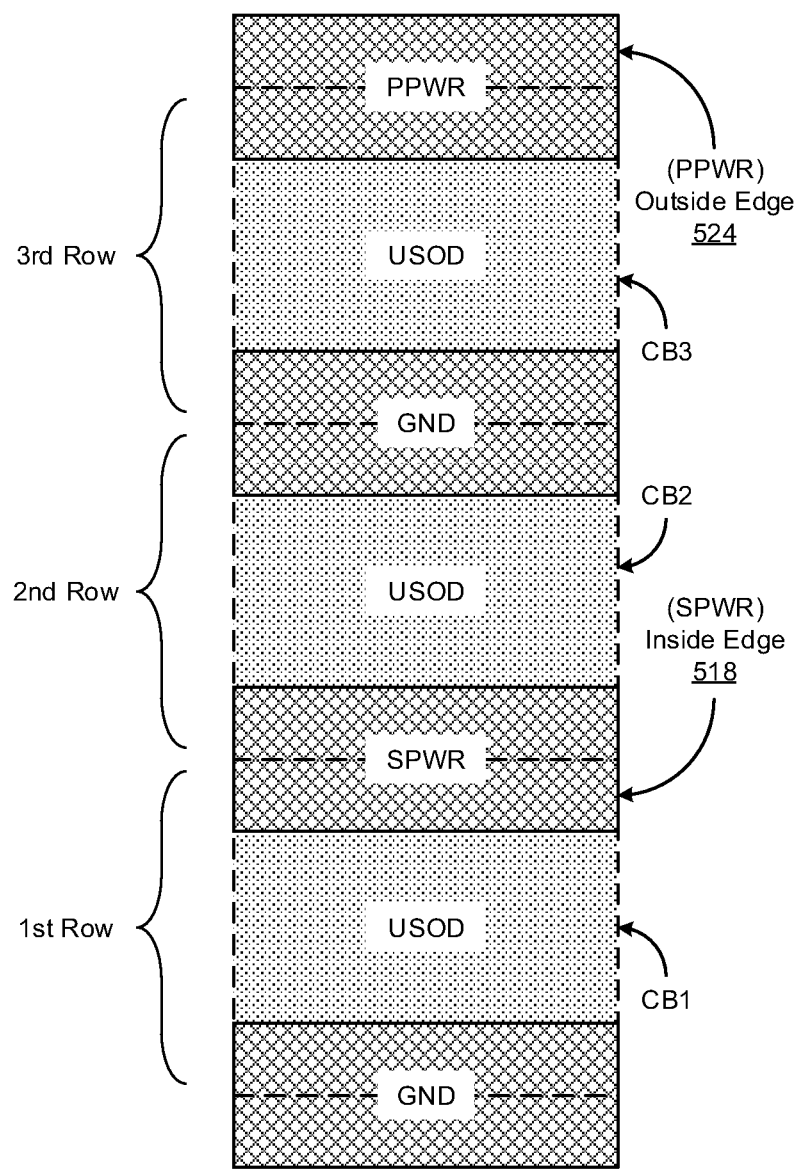
Figure 5D:
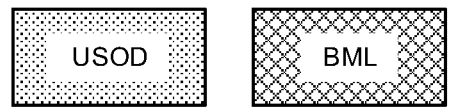
Figure 5D:
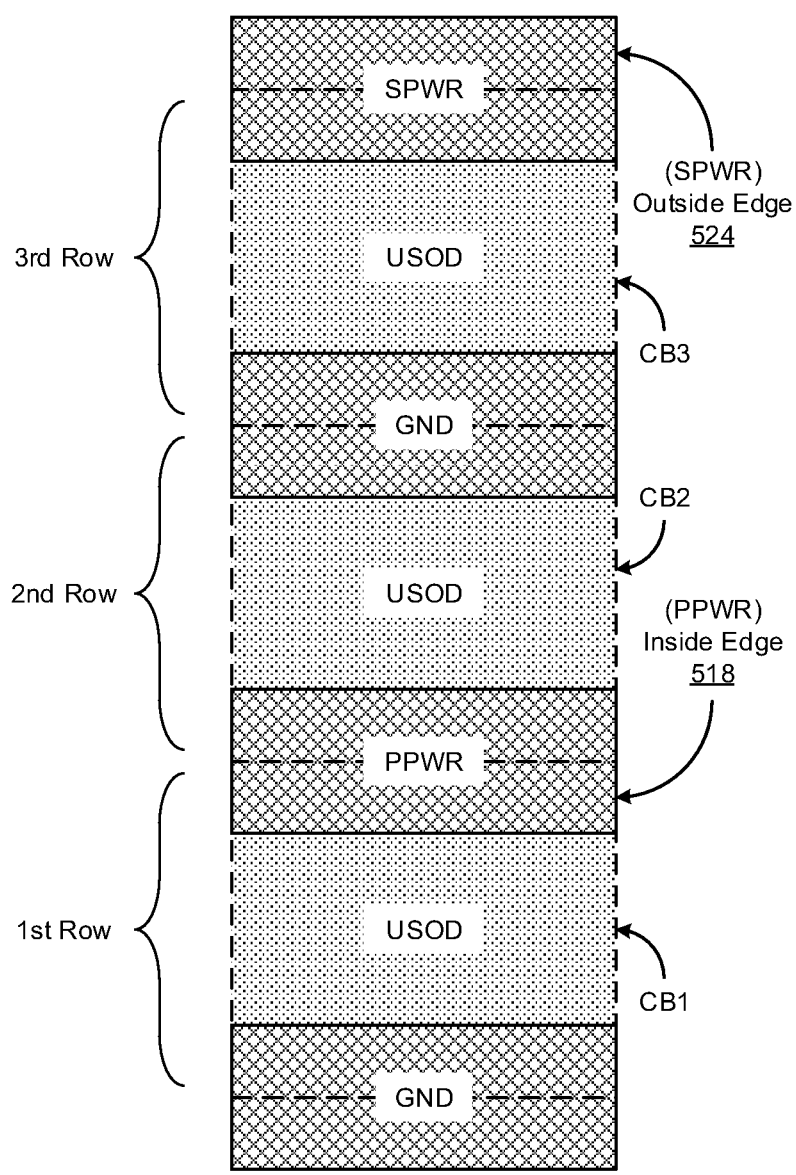

FIGS. 5A-5D illustrate other diagrams of BPDN architecture in accordance with implementations described herein. In particular, FIG. 5A shows a diagram 500A of BPDN architecture 504A with secondary power (SPWR) in a single row, FIG. 5B shows a diagram 500B of BPDN architecture 504B with primary power (PPWR) and secondary power (SPWR) in a single row, FIG. 5C shows a diagram 500C of BPDN architecture 504C with primary power (PPWR) and secondary power (SPWR) in multiple rows, and FIG. 5D shows another diagram 500D of BPDN architecture 504D with primary power (PPWR) and secondary power (SPWR) in multiple rows.

As shown in FIG. 5A, the BPDN architecture 504A may refer to an area efficient cell design of BPDN cell architecture. The BPDN architecture 504A may include the backside power distribution network (BPDN) with backside power rails that provide secondary power (SPWR) and ground (GND). The BPDN architecture 504A may have a cell architecture with a cell boundary (CB) along with an area defined for a useful span of device (USOD). In some instances, the secondary power rail (SPWR) provides the secondary power supply (SPWR), and the grounded power rail (GND) may be coupled to ground (GND). The secondary power rail (SPWR) and/or the grounded power rail (GND) may be formed with the same or different backside metal layers (BML). In some instances, the BPDN architecture 504A in FIG. 5A represents an area efficient cell design with only the secondary power supply (SPWR) along with placement restrictions on east edges, west edges and north edges.

As shown in FIG. 5B, the BPDN architecture 504B may refer to an area efficient cell design of BPDN cell architecture. The BPDN architecture 504B may include the backside power distribution network (BPDN) with backside power rails that provide the primary power supply (PPWR) and the secondary power supply (SPWR) along with ground (GND). In some instances, the backside power rails may include a first power rail with a first segment (PPWR) that provides the primary power supply (PPWR), a second segment (SPWR) that provides the secondary power supply (SPWR), and the power rail interruption 508 that separates the first segment (PPWR) from the second segment (SPWR). The backside power rails include a second power rail (GND) that is continuous and coupled to ground (GND).

In some implementations, the cell architecture may be a standard cell architecture, and the cell architecture may have a cell boundary (CB) with multiple areas of a useful span of the device (USOD) enclosed within the cell boundary (CB). The interruption 508 may refer to a gapped spatial interval in the first power rail that is disposed between the first segment (PPWR) and the second segment (SPWR) of the first power rail. The primary power supply (PPWR) may be provided in a first power domain (PPWR), and the secondary power supply (SPWR) may be provided in a second power domain (SPWR) that is different than the first power domain (PPWR). Also, in some instances, the first power domain (PPWR) may refer to the core power domain (PPWR), and the second power domain (SPWR) may refer to the global core power domain (SPWR), and the second power rail (GND) may refer to a grounded power rail that is coupled to ground (GND). In some instances, the BPDN architecture 504B in FIG. 5B represents an area efficient cell design with primary and secondary power supply with placement restrictions on east edges, west edges and north edges.

As shown in FIG. 5C, the BPDN architecture 504C may refer to an area efficient cell design of the BPDN cell architecture. In some implementations, the backside power rails may be arranged in multiple rows including a first row (1st row) that provides the secondary power supply (SPWR) at an inside edge 518 of the cell architecture 504C and a second row (2nd row) that also provides the secondary power supply (SPWR) at the inside edge 518 of the cell architecture 504C. The multiple rows may include a third row (3rd row) that provides the primary power supply (PPWR) at an outside edge 524 of the cell architecture 504C, and the second row is disposed between the first row (1st row) and the third row (3rd row).

In some implementations, the BPDN architecture 504C in FIG. 5C may represent an area efficient cell design with primary and secondary power supplies (PPWR, SPWR) and with placement restrictions on east edges, west edges and north edges, and also, the BPDN architecture 504C may be used when the cell architecture has more devices connected to the secondary power supply (SPWR) than the primary power supply (PPWR).

As shown in FIG. 5D, the BPDN architecture 504D may refer to an area efficient cell design of the BPDN cell architecture. In some implementations, the backside power rails may be arranged in multiple rows including a first row (1st row) that provides the primary power supply (PPWR) at the inside edge 518 of the cell architecture 504D and a second row that provides the primary power supply (PPWR) at the inside edge 518 of the cell architecture 504D. The multiple rows may include a third row (3rd row) that provides the secondary power supply (SPWR) at an outside edge 524 of the cell architecture 504D, and the second row (2nd row) is disposed between the first row (1st row) and the third row (3rd row).

In some implementations, the BPDN architecture 504D in FIG. 5D may represent an area efficient cell design with primary and secondary power supplies (PPWR, SPWR) and with placement restrictions on east edges, west edges and north edges, and also, the BPDN architecture 504D may be used when the cell architecture has more devices connected to the secondary power supply (SPWR) than the primary power supply (PPWR).

In some implementations, the cell architectures 504C, 504D may refer to standard cell architectures, and also, the cell architectures 504C, 504D may have a first cell boundary (CB1), a second cell boundary (CB2) and a third cell boundary (CB2) with each cell boundary (CB1, CB2, CB3) having a corresponding area of USOD that may be enclosed within each cell boundary (CB1, CB2, CB3).

Figure 6:
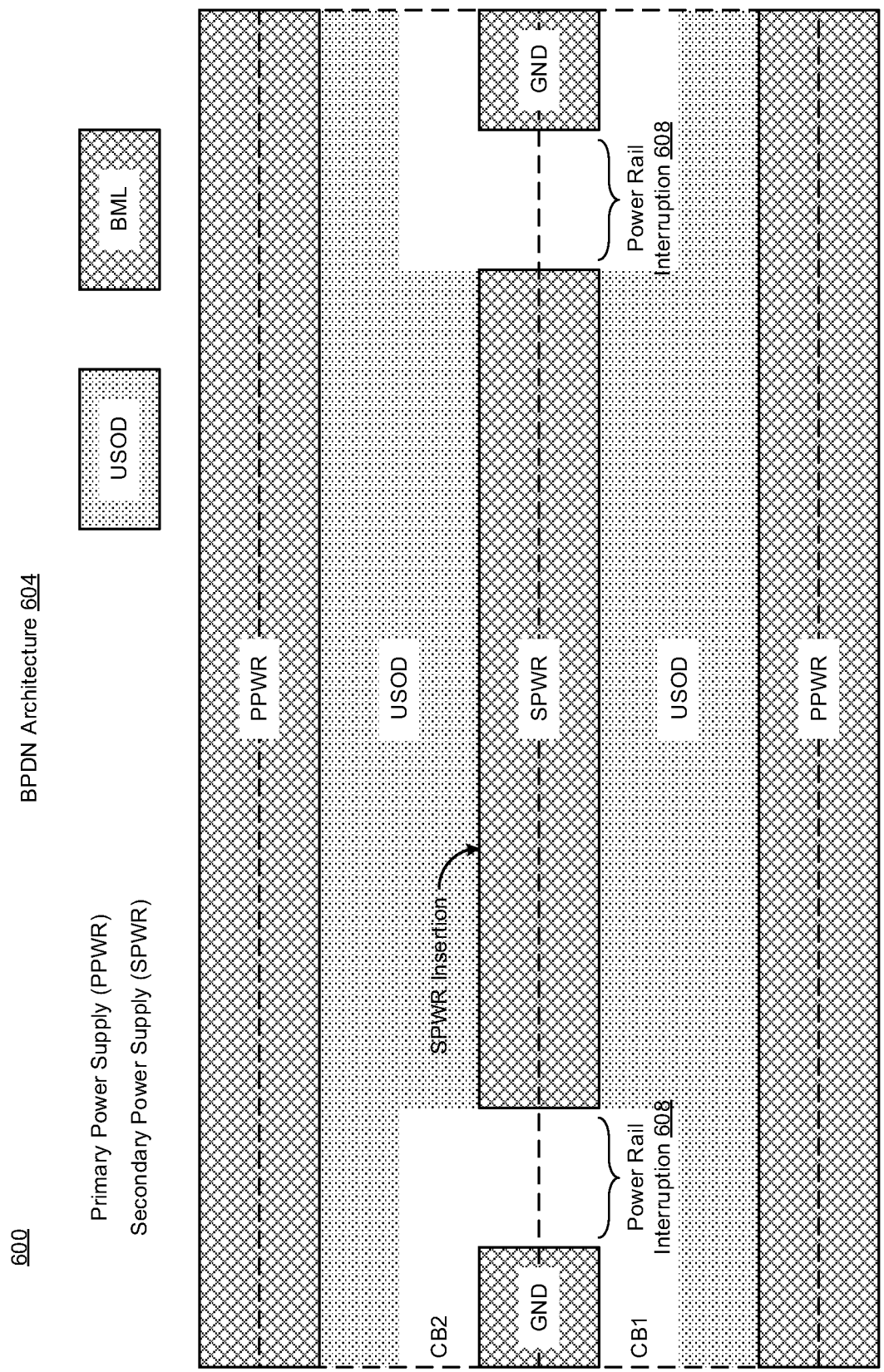
FIG. 6 illustrates another diagram of BPDN architecture in accordance with various implementations described herein.

FIG. 6 illustrates another diagram 600 of BPDN architecture 604 in accordance with various implementations described herein.

As shown in FIG. 6, the BPDN architecture 604 refers to a multi-row cell having a cell architecture with a first row cell boundary (CB1) and a second row cell boundary (CB2), wherein each cell boundary (CB1, CB2) has a corresponding area of USOD enclosed within each cell boundary (CB1, CB2). The BPDN architecture 604 may include a backside power distribution network (BPDN) with backside power rails that provide the primary power supply (PPWR), the secondary power supply (SPWR) and ground (GND). The backside power rails may have one or more continuous power rails (PPWR) that are coupled to the primary power supply (PPWR), and also, the backside power rails may have one or more interrupted power rails (GND) having grounded segments (GND) coupled to ground (GND), power segments (SPWR) that provide the secondary power supply (SPWR), and power rail interruptions 608 that separate the grounded segments (GND) from the power segments (SPWR).

In various implementations, the BPDN cell architecture 604 may refer to a standard cell architecture for a power gate design, and the BPDN cell architecture 604 may include multiple areas of USOD that are enclosed within the first cell boundary (CB1) and the second cell boundary (CB2). In some instances, the primary power supply (PPWR) may be provided in a first power domain (PPWR) associated with the core voltage (PPWR), and the secondary power supply (SPWR) may be provided in a second power domain (SPWR) associated with the global core voltage (SPWR), and the grounded segments (GND) are coupled to ground (GND). Moreover, in some instances, FIG. 6 represents a power-gate cell design that has both primary and secondary power supply (PPWR, SPWR), wherein the secondary power supply (SPWR) refers to an always-on global power supply.

Figure 7A:
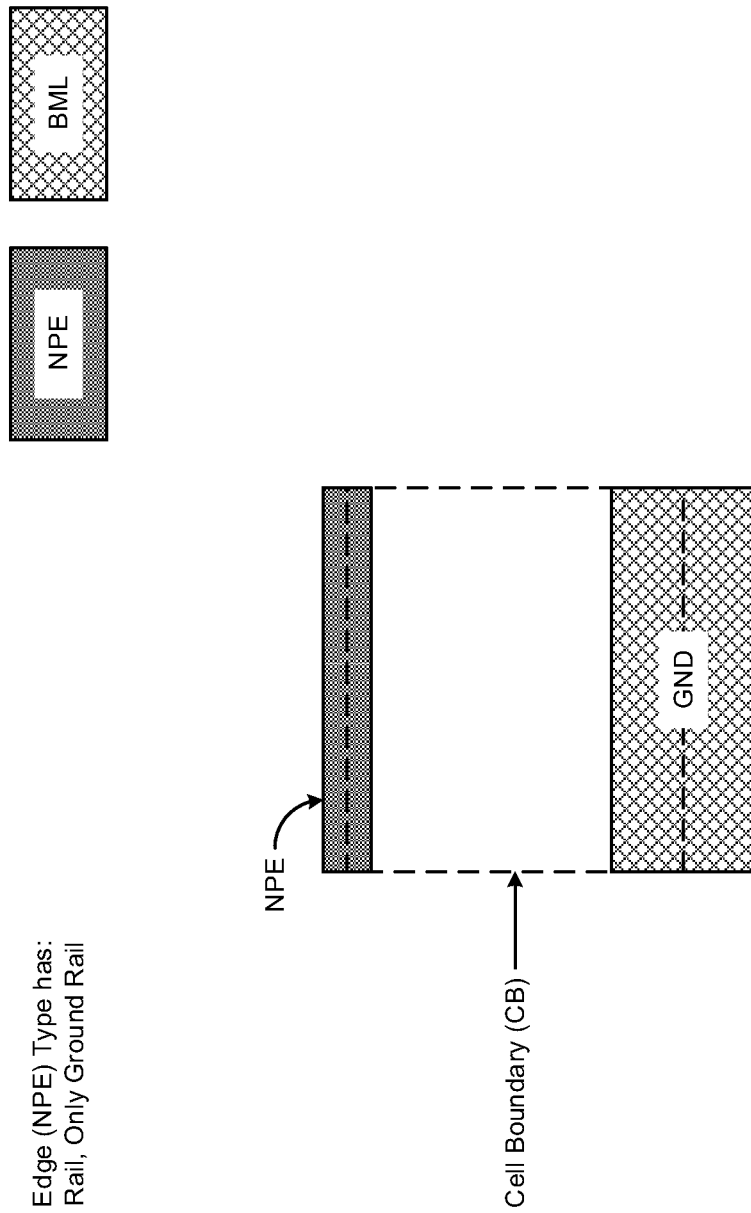
FIGS. 7A-7E illustrate other diagrams of BPDN architecture in accordance with various implementations described herein.
Figure 7B:
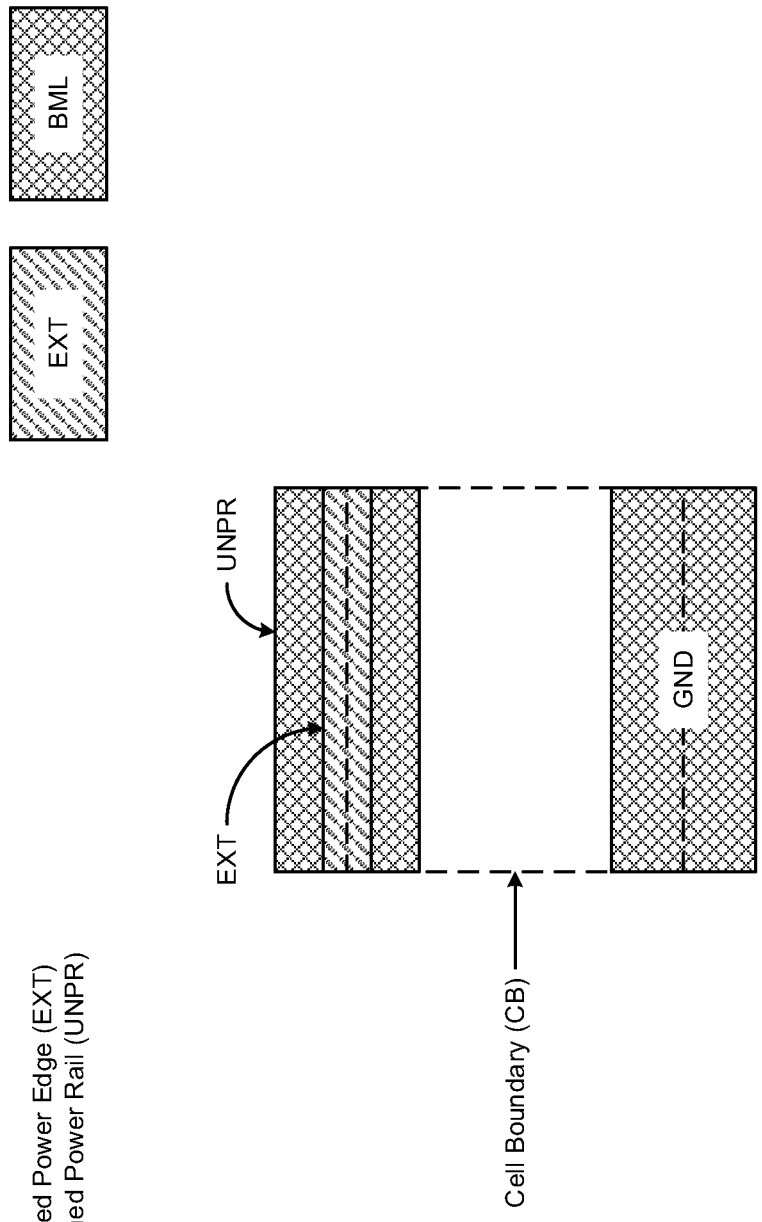
Figure 7C:
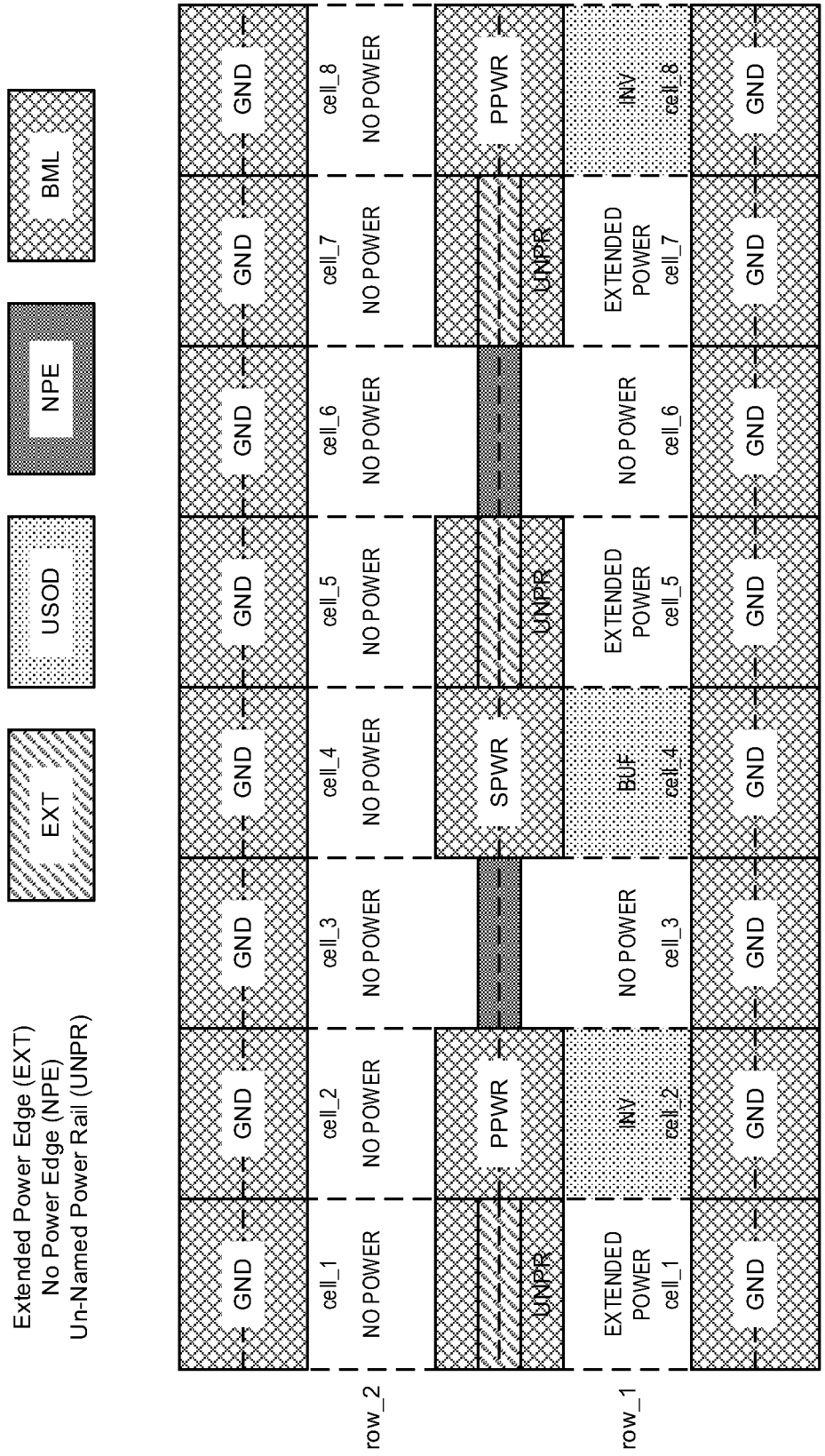
Figure 7D:
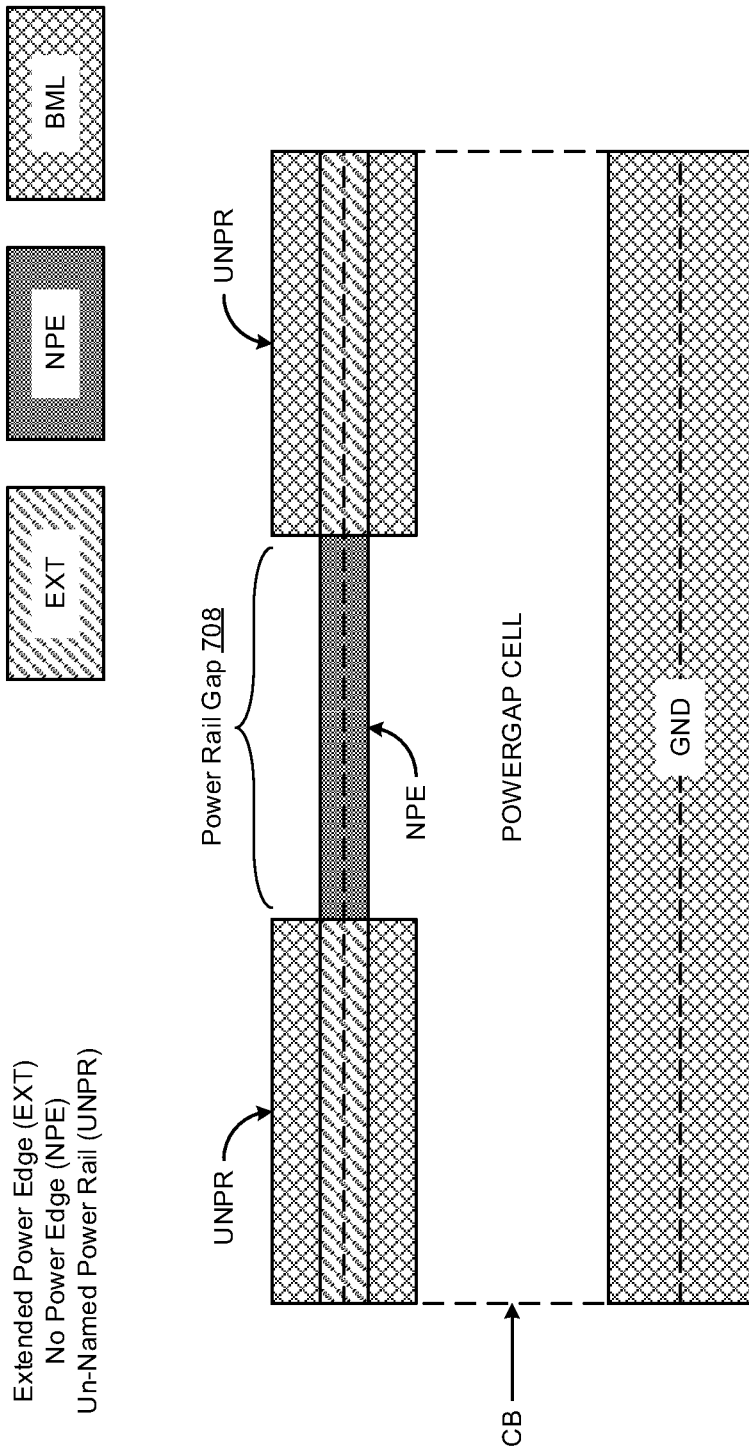
Figure 7E:
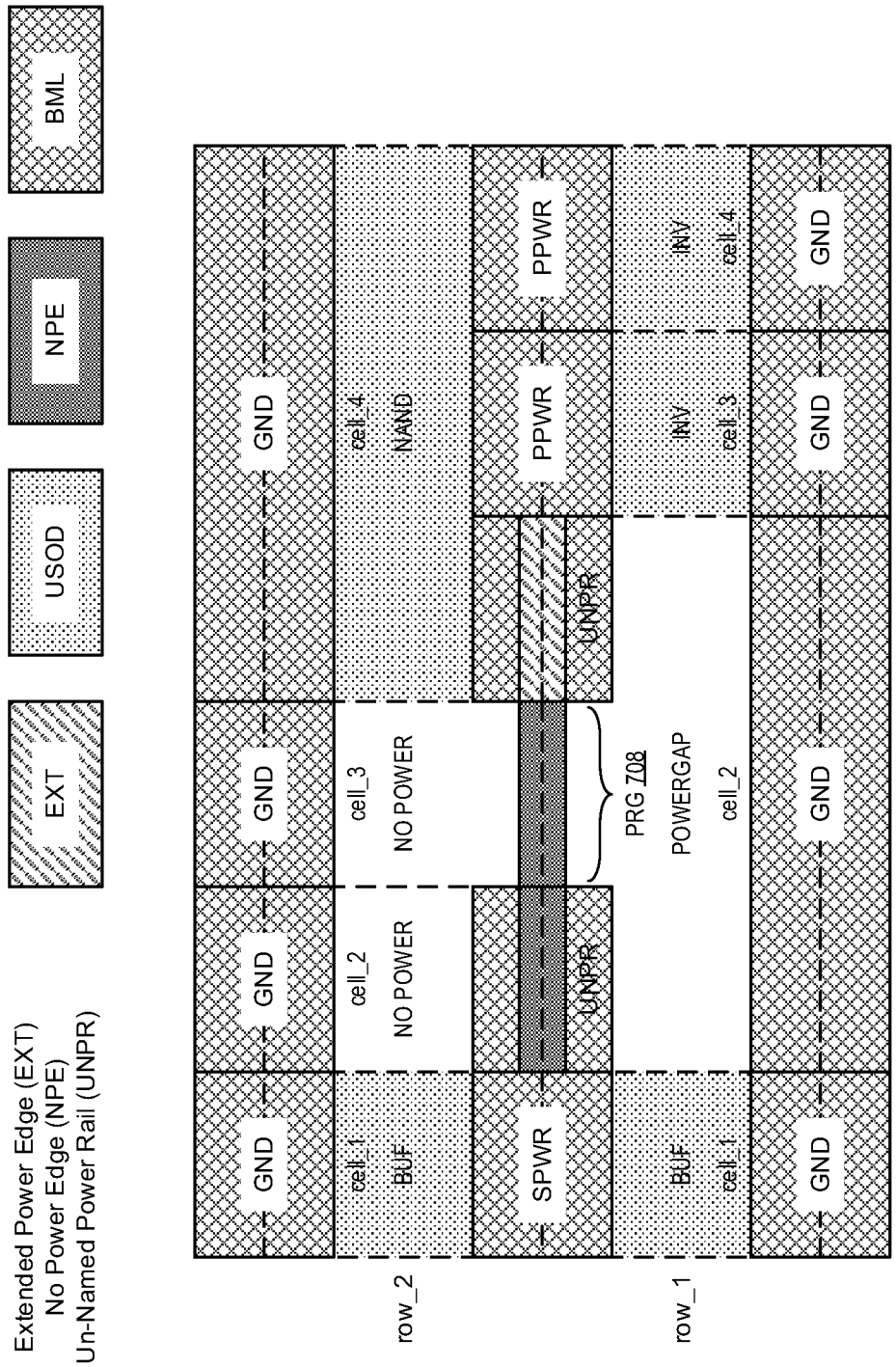

FIGS. 7A-7E illustrate various diagrams of BPDN architecture in accordance with implementations described herein. In particular, FIG. 7A shows a diagram 700A of BPDN architecture 704A having a cell type with no power edge (NPE), FIG. 7B shows a diagram 700B of BPDN architecture 704B having a cell type with an extended power edge (EXT), and FIG. 7C shows an implementation diagram 700C of BPDN architecture 704C having the NPE cell type and the EXT cell type. Moreover, FIG. 7D shows a diagram 700D of BPDN architecture 704D having a cell type with a power rail gap 708, and also, FIG. 7E shows an implementations diagram 700E of BPDN architecture 704E having the NPE cell type and the EXT cell type along with the power rail gap 708.

In some implementations, the NPE cell type may refer to the cell edge of a cell as not having the power rail in the rail position associated with the cell edge. Also, the EXT cell type may refer to the cell edge of a cell as having an un-named power rail (UNPR) in the rail position associated with the cell edge. These aspects and various other aspects related to cell edge types are described in greater detail herein in reference to FIGS. 7A-7E.

As shown in FIG. 7A, the BPDN architecture 704A may refer to an area efficient cell design of BPDN cell architecture. The BPDN architecture 704A may include a no power edge (NPE) cell type with no power rails in the rail position associated with the NPE edge and a grounded rail (GND). The BPDN architecture 704A may have a cell architecture with a cell boundary (CB) and with an area defined for a useful span of device (USOD). In some instances, the BPDN architecture 704A may have no power rails and may only have the grounded power rail (GND). As such, the BPDN architecture 704A in FIG. 7A may represent an area efficient cell design with no power rails and with only a grounded rail (GND) that is disposed on a south edge (or lower edge) of the cell boundary (CB).

As shown in FIG. 7B, the BPDN architecture 704B may refer to an area efficient cell design of BPDN cell architecture. The BPDN architecture 704B may include an extended power edge (EXT) cell type with an un-named power rail (UPPR) in the rail position associated with the EXT edge and a grounded rail (GND). The BPDN architecture 704B may have a cell architecture with a cell boundary (CB) and with an area defined for a useful span of device (USOD). Also, in some instances, the BPDN architecture 704B may include the un-named power rail (UPPR) along with the grounded power rail (GND). As such, the BPDN architecture 704B in FIG. 7B may represent an area efficient cell design with an un-named power rail (UPPR) and a grounded rail (GND) that is disposed on a south edge (or lower edge) of the cell boundary (CB).

In some implementations, FIG. 7C represents an example usage of the extended power cell (EXT) and no power cell (NPE), wherein FIG. 7C shows a usage diagram 700C of BPDN architecture 704C with the NPE cell type and the EXT cell type.

As shown in FIG. 7C, the BPDN architecture 704C may have a first row (row_1) of multiple cells having multiple cell types, such as, e.g., the EXT cell type, the NPE cell type, and the UNPR cell type. The multiple cell types may also include various standard cell types, such as, e.g., an inverter cell type (INV) and a buffer cell type (BUF). In some instances, the first row (row_1) and the second row (row_2) may each include a number (N) of cells, such as, e.g., 8 cells. Also, the BPDN architecture 704C may include backside power rails, such as, e.g., a segmented power rail disposed between a lower grounded power rail (GND) and upper grounded power rail (GND). In some instances, the segmented power rail may have UNPR segments, PPWR segments, no power (NP) segments and SPWR segments that are provided in corresponding cells associated with each row (row_1, row_2).

As shown in FIG. 7D, the BPDN architecture 704D may refer to an area efficient cell design of BPDN cell architecture. The BPDN architecture 704D may include a no power (NP) rail segment with no power rails disposed between UNPR rail segments along with the grounded rail (GND). The BPDN architecture 704D may have a cell architecture with a cell boundary (CB) and with an area defined for a useful span of device (USOD). Also, the BPDN architecture 704D may include an UNPR rail with a power rail gap 708 disposed between the UNPR segments of the UNPR rail. Therefore, the BPDN architecture 704D in FIG. 7D may represent an area efficient cell design with PR rail segments and the power rail gap 708 along with the grounded rail (GND). In some implementations, the BPDN architecture 704D may represent a cell having the extended power edge (EXT) and the no power edge (NPE), which may be provided as a combination of the extended power cell and the no power cell.

In some implementations, FIG. 7D represents an example usage of the power gap cell in FIG. 7D, wherein FIG. 7D shows a usage diagram 700D of BPDN architecture 704D with the power gap cell along with the NP cell and the EXT cell.

As shown in FIG. 7D, the BPDN architecture 704D may have a first row (row_1) of multiple cells having multiple cell types, such as, e.g., the power gap cell, the EXT cell, the NP cell, and the UNPR cell. The multiple cells may also include various standard cells, such as, e.g., the inverter cell (INV), the buffer cell (BUF), and a logic cell (e.g., a NAND cell).

In some implementations, the BPDN architecture 704D may represent a multi-cell architecture having multiple cell structures of multiple cell types, wherein each cell structure may have a backside power distribution network (BPDN) with backside power rails arranged in the multiple cell types, and wherein each cell structure may have a grounded edge (GND) and a configured edge (e.g., SPWR, UNPR, Power Gap, PPWR) that may provide the non-powered edge (NPE), the extended-power edge (EXT), and/or the un-named powered edge (UNPR) with at least one interruption (i.e., power rail gap 708).

In some implementations, the first row (row_1) and the second row (row_2) may each include a number (N) of cells, such as, e.g., 4 cells. For instance, as shown in reference to FIG. 7E, the first row (row_1) may include a buffer cell (BUF) as a first cell, a power gap cell as a second cell, an inverter cell (INV) as a third cell, and another inverter cell (INV) as a fourth cell. Also, the second row (row_2) may include a buffer cell (BUF) as a first cell, a no power cell (NP) as a second cell, another no power cell (NP) as a third cell, and a logic cell (NAND) as a fourth cell. In some instances, each cell structure in the BPDN architecture 704E may be coupled to a backside power distribution network (BPDN) with backside power rails arranged in multiple cell types so as to provide at least one of the primary power supply (PPWR), the secondary power supply (SPWR), ground (GND) or no power (NP).

In reference to the cell types in the BPDN architecture 704E, a first cell type may have a grounded edge coupled to ground (GND), and the configured edge that may provide the non-powered edge (NPE). Also, a second cell type may have a grounded edge coupled to ground (GND) and the configured edge that may provide the extended-power edge (EXT) coupled to the primary power supply (PPWR) or the secondary power supply (SPWR). Also, a third cell type may have a grounded edge coupled to ground (GND) and a configured edge that may provide the powered edge coupled to the primary power supply (PPWR) or the secondary power supply (SPWR), wherein the powered edge has the power rail gap 708 (or interruption) with another non-powered edge (NPE) inserted in a gapped spatial interval that is provided by the power rail gap 708 (or interruption).

As described herein, the primary power supply may be provided in reference to the first power domain associated with the core voltage (PPWR), and also, the secondary power supply may be provided in reference to the second power domain associated with the global core voltage (SPWR). Also, the grounded edge may be coupled to ground (GND).

In some implementations, the secondary power/ground backside rails may touch the east/west edge of the cell, wherein one edge may have a standard power rail (e.g., when and if the cell needs power from the primary power supply) and the other edge may refer to a secondary power rail. Also, depending on which power/ground rail touches the cell edge, the touched edge may have an edge type assigned. There may be rules on how these edge types are configured to abut during place and route. Some same edge types may abut with zero spacing, and different edge types may abut with "n" spacing, wherein "n" is determined by design rules of the various process technologies used in physical design.

Some cells have different power supply rails wilt abutting edges that may maintain rail spacing between the cell edges, and a power gap cell may be designed with special edge types that no other standard cells have. The power gap cell may be configured to abut with any other edge types with zero spacing, and to make sure that the gap created by the Place-and-Route (PNR) tool between cell edge of same edge types are filled, special filler cells may be needed for each edge type, except for the power gap cell.

Also, instead of building the area overhead within each cell that has a secondary supply, the area overhead may be applied at the PNR level, which leaves placement to the EDA tool to perform the placement based on edge types and rules for abutment along with special cells created for this purpose. This concept may save area when the EDA tool places multiple cells with same secondary power supply in a row that sits closer with zero spacing, and the area overhead may be applicable only at the end of the chain. Similarly, some cells with standard power rails on one edge and secondary power rails on another edge may be placed in a chain with zero spacing by alternately flipping the cell on its y-axis. This may also reduce area overhead from each cell to the end of the chain, and if the chain ends with edges of the standard rail, then no additional area overhead may be applied.

Figure 8:
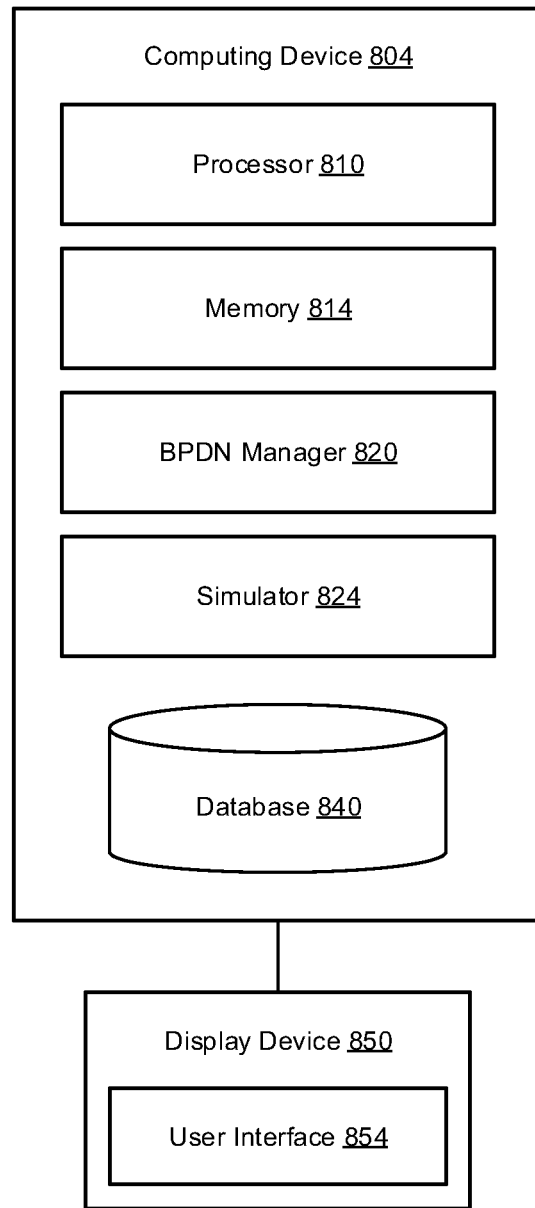
FIG. 8 illustrates a diagram of a system for providing backside power distribution techniques in physical design in accordance with implementations described herein.

FIG. 8 shows a system 800 for providing backside power distribution techniques in physical design in accordance with implementations described herein.

In reference to FIG. 8, the system 800 may be associated with a computer or a computing device 804 that is implemented as a special purpose machine for providing backside power distribution techniques in physical design, as described herein. In some instances, the computing device 804 may refer to an apparatus having any standard element(s) and/or component(s), including at least one processor(s) 810, memory 812 (e.g., non-transitory computer-readable storage medium), one or more database(s) 840, power, peripherals, and various other computing elements and/or components that may not be specifically shown in FIG. 8. The computing device 804 may include instructions recorded or stored on the non-transitory computer-readable medium 812 that are executable by the at least one processor 810. The computing device 804 may be associated with a display device 850 (e.g., monitor or other display) that may be used to provide a user interface (UI) 852, such as, e.g., a graphical user interface (GUI). In some instances, the UI 852 may be used to receive various parameters and/or preferences from users for managing, operating, and/or controlling the computing device 804. Therefore, the computing device 804 may include the display device 850 for providing various types of output to a user, and also, the display device 850 may include the UI 852 for receiving various types of input from the user.

As shown in reference to FIG. 8, the computing device 804 may include a BPDN manger 820 that may be configured to cause the processor 810 to implement the backside power distribution schemes and techniques described herein in reference to FIGS. 1-7E, including methodologies related to implementing various related integrated circuitry (IC) in physical design. The BPDN manger 820 may be implemented in hardware and/or software. For instance, if implemented in software, the BPDN manger 820 may be stored in memory 812 and/or a database 840. Also, in some instances, if implemented in hardware, the BPDN manger 820 and related components may refer to a separate processing component that is configured to interface with the processor 810.

In some instances, the BPDN manger 820 may be configured to cause the at least one processor 810 to perform various operations, as provided herein in reference to backside power distribution schemes and techniques described in FIGS. 1-7E. The memory 812 may include instructions stored thereon that, when executed by the processor 810, cause the processor 810 to perform one or more or all of the following operations.

For instance, the BPDN manger 820 may be configured to cause the at least one processor 810 to perform operations associated with providing a cell architecture having a backside power distribution network with backside power rails that provide a primary power supply (PPWR). Also, at least one backside power rail may be interrupted and a secondary power supply (SPWR) is inserted in a gapped spatial interval of the interruption.

The BPDN manger 820 may be configured to cause the at least one processor 810 to perform operations associated with providing a backside power distribution network with backside power rails that provide a primary power supply (PPWR), a secondary power supply (SPWR) and ground (GND). Also, the backside power rails may include a first power rail with a first segment that provides the primary power supply (PPWR), a second segment that provides the secondary power supply (SPWR), and an interruption that separates the first segment from the second segment. Also, the backside power rails may include a second power rail that is continuous and coupled to ground (GND).

The BPDN manger 820 may be configured to cause the at least one processor 810 to perform operations associated with providing a backside power distribution network with backside power rails that provide a primary power supply (PPWR), a secondary power supply (SPWR) and ground (GND). Also, the backside power rails may include one or more continuous power rails coupled to the primary power supply (PPWR), and the backside power rails may include one or more interrupted power rails with grounded segments coupled to ground (GND), power segments that provide the secondary power supply (SPWR), and one or more interruptions that separate the grounded segments from the power segments.

The BPDN manger 820 may be configured to cause the at least one processor 810 to perform operations associated with providing a multi-cell architecture having multiple cell structures of multiple cell types. In some instances, each cell structure has a backside power distribution network with backside power rails arranged in the multiple cell types, and each cell structure has a grounded edge and a configured edge that provides a non-powered edge, an extended-power edge, or a powered edge with an interruption.

In accordance with various implementations described in reference to FIGS. 1-7E any one or more or all of these operations performed by the BPDN manger 820 may be altered, modified, or changed to thereby provide the various specific embodiments as shown in FIGS. 1-7E. Further, the backside power distribution schemes and techniques described herein may be used to provide various integrated circuitry in a form of a logic block or module having a physical structure that is included in a place-and-route environment for electronic design automation (EDA) tools for related EDA systems.

Further, in reference to FIG. 8, the computing device 804 may include a simulator 824 that is configured to cause the processor 810 to generate one or more simulations of the integrated circuitry. The simulator 824 may be referred to as a simulating component and/or module that may be implemented in hardware and/or software. If implemented in software, the simulator 824 may be recorded or stored in memory 812 or database 840. If implemented in hardware, the simulator 820 may refer to a separate processing component configured to interface with the processor 810. In some instances, the simulator 824 may refer to a SPICE simulator that is configured to generate SPICE simulations of integrated circuitry. Generally, SPICE is an acronym for Simulation Program with Integrated Circuit Emphasis, which is an open source analog electronic circuit simulator. Also, SPICE may refer to a general-purpose software program used by the semiconductor industry to check integrity of integrated circuit designs and to predict behavior of integrated circuit designs. Thus, in some implementations, the BPDN manger 820 may be configured to interface with the simulator 824 so as to thereby generate various timing data and information based on one or more simulations (including, e.g., SPICE simulations) of integrated circuitry that may be utilized for analyzing performance characteristics of integrated circuitry including timing data of integrated circuitry. Further, the BPDN manger 820 may be configured to use simulations (e.g., SPICE simulations) of integrated circuitry for evaluating operating behavior and conditions thereof.

In some instances, the computing device 804 may include one or more databases 840 configured to store and/or record various data and information related to implementing slew-rate characterization schemes and techniques in physical design. In various instances, the database(s) 840 may be configured to store and/or record data and information related to integrated circuitry, operating conditions, operating behavior and/or timing data. Also, the database(s) 840 may be configured to store data and information related to the integrated circuitry and timing data in reference to simulation data (e.g., SPICE simulation data).

The various schemes and techniques described herein provide various methods for electronic design automation (EDA) that enable the usage of the collection of area efficient standard cells to build, design and/or provide area efficient standard cell blocks to support a backside power distribution network (BPDN). For instance, in reference to physical designs of semiconductor integrated circuits, automated tools may be used at various stages of a physical design including logic synthesis where the logical design of a circuit, standard cell library information and various other parameters are provided as input to generate gate level netlists. Also, using place-and-route (PNR) techniques where the gate level netlist from logic synthesis, standard cell libraries and/or various other parameters may be provided as input to generate a physical layout design of the integrated circuit and/or its components.

In some implementations, logic synthesis tools and PNR tools may be limited when seeking area efficiency with standard cells that have any electrically isolated structures, such as, e.g., NWELLs and/or power/ground rails, because standard cells are designed with area overhead built into each cell that needs to have such electrically isolated elements and each instance of these cells causes area overhead. PNR tools typically require each standard cell to follow specific boundary conditions when abutting to each other. So as to overcome some of these limitations, edge-types for cell edges may be assigned at cell level, and also, design rules may be provided for different edge-types to abut or maintain minimum space from each other. In some cases, even traditional edge-type methods may not provide an area efficient placement solution when there are electrically isolated structures in the cell.

Therefore, various schemes and techniques described herein enable area efficient synthesis and PNR processes by using specially designed standard cell layouts and methods when the standard cell needs to have electrically isolated structures, such as, e.g., different potential NWELLs, power rails that couple to the secondary supply in the physical cell design, which is different from the primary supply of the physical cell design. Thus, various schemes and techniques described herein are predominantly applicable in semiconductor processes that support a backside power distribution network (BPDN) having backside power rails that couple to transistors on the frontside through buried vias so as to interrupt the primary power rails and/or ground rails for insertion of a secondary power rail segment and/or a ground rail segment. Also, the various schemes and techniques described herein may thus be applied to semiconductor processes that have frontside rails for inserting secondary rail segments by interrupting primary rails and for isolating NWELLs of different potential in an area efficient manner. Moreover, in some instances, different potentials may refer to a difference in voltage values and/or different power/voltage supplies.

Figure 9:
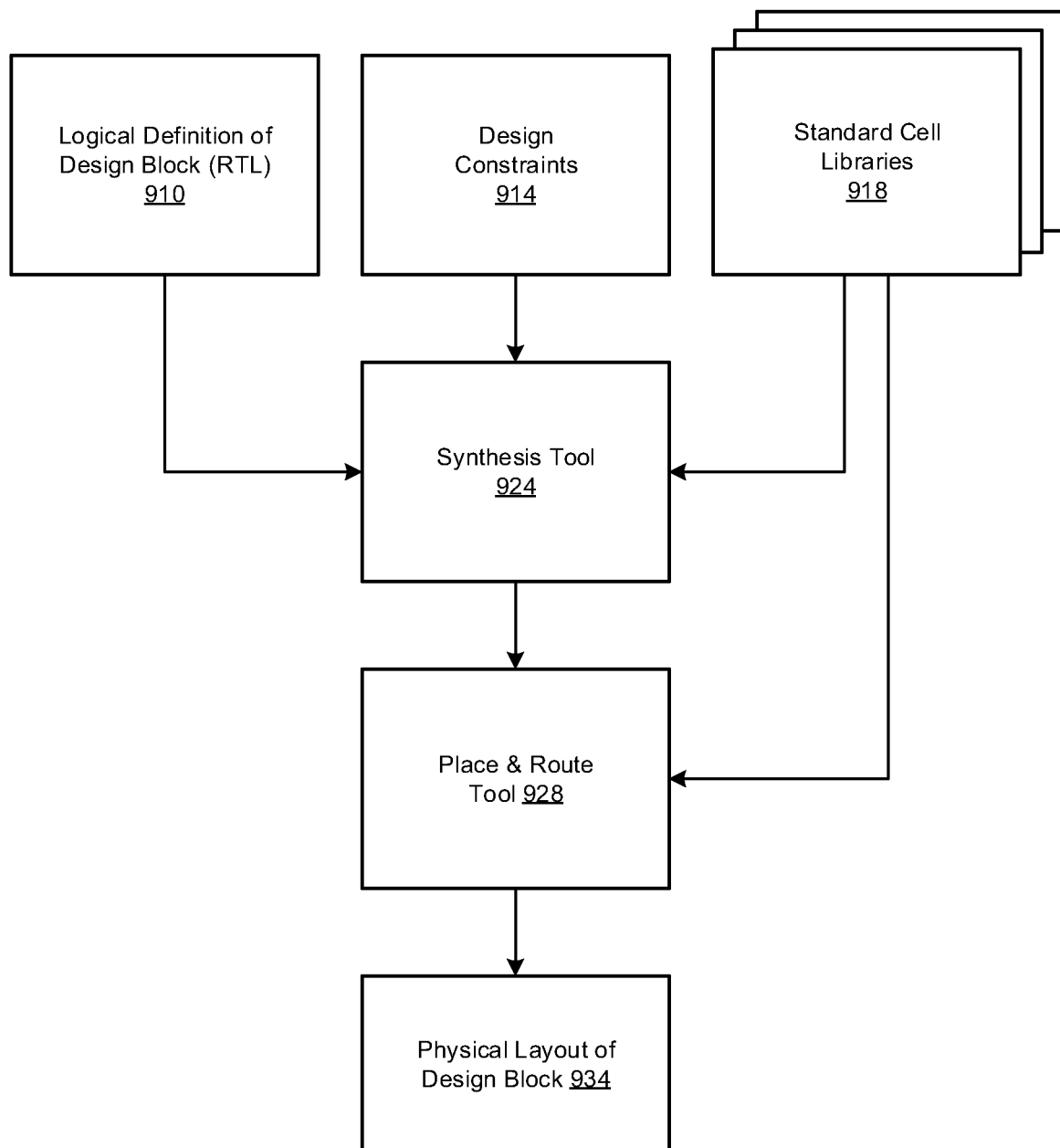
FIG. 9 illustrates a diagram of a synthesis and place-and-route (PNR) process in accordance with various implementations described herein.

FIG. 9 illustrates a synthesis and place-and-route (PNR) process 900 along with techniques related thereto in accordance with implementations described herein. In various implementations, the synthesis and place-and-route (PNR) process 900 refers to a method for utilizing the synthesis and place-and-route (PNR) process 900 that may be used to build, generate and/or provide a physical cell layout structure of a design block.

It should be understood that even though process 900 indicates a particular order of operation execution, in some cases, various particular portions of the operations may be executed in a different order, and on different systems. In other cases, additional operations and/or steps may be added to and/or omitted from process 900. Also, process 900 may be implemented in hardware and/or software. If implemented in hardware, process 900 may be implemented with various components and/or circuitry, as described herein in reference to FIGS. 1-8. Otherwise, if implemented in software, process 900 may be implemented as a program and/or software instruction process configured for synthesis and PNR techniques, as described herein. Also, if implemented in software, instructions related to implementing process 900 may be stored and/or recorded in memory and/or a database. For instance, various types of computing devices, such as, e.g., computer system 800 in FIG. 8, having a processor and memory may be configured to perform process 900.

In various implementations, the process 900 may refer to a method of designing, providing, building, fabricating and/or manufacturing power rail architecture as an integrated system, device and/or circuit that may involve use of various IC circuit components described herein so as to implement various power distribution schemes and techniques associated therewith. In some implementations, power rail architecture may be integrated with various computing circuitry and other related components on a single chip, and the power distribution circuitry may be implemented in some embedded systems for automotive, electronic, mobile, server and Internet-of-things (IoT) applications, including remote sensor nodes.

At block 910, process 900 may provide logical definitions of a design block for RTL in digital circuit design. In some implementations, register-transfer level (RTL) may refer to a physical layout design that characterizes patterns and behaviors of a digital circuit in terms of data signal movement through digital signal paths between circuit components, and RTL may have information related to logical operations performed on data signals. At block 914, process 900 may obtain, provide and/or generate design constraints of a design block for RTL in digital circuit design. Also, at block 918, process 900 may access, obtain and/or utilize information stored in one or more standard cell libraries.

At block 924, process 900 may interface with a synthesis tool that is configured to access, obtain and/or utilize the logical definitions of design blocks from block 910, the design constraints from block 914, and/or information stored in the one or more standard cell libraries from block 918. In some implementations, the process 900 is configured to interface with the synthesis tool so as to synthesize standard cells for a physical design having a power supply net with power supply rails. The power supply net may refer to different power supplies that are selectively coupled to each standard cell via the power supply rails associated with each different power supply of different power supplies. In various implementations, synthesizing the standard cells may refer to a power edge-type aware synthesis, and a synthesis tool may be configured to process information provided in the one or more standard cell libraries and in relation to various design constraints. The synthesis tool may be configured to synthesize standard cells having electrically isolated structures that impact area as a constraint, and the synthesis tool may be configured to group the synthesized standard cells together at a global level to achieve an area efficient design for use by a place-and-route (PNR) tool.

At block 928, process 900 may interface with a place-and-route (PNR) tool that is configured to access, obtain and/or utilize synthesized standard cells for a physical design from block 924 along with information stored in the one or more standard cell libraries from block 918. In some implementations, the process 900 is configured to employ the place-and-route tool (PNR) so as to define edge-types for each standard cell of the standard cells in the physical design based on the power supply net and the power supply rails that touch at least one edge of each standard cell of the standard cells. The at least one edge of each standard cell refers to at least one of an upper edge, a lower edge that is opposite to the upper edge, a right-side edge, and a left-side edge that is opposite to the right-side edge. Also, in some implementations, the process 900 may be configured to employ the PNR tool so as to position standard cells having similar edge-types adjacent to each other while maintaining a minimum length rule for isolated power rail segments by grouping the cells with similar edge-types to reduce a number of interruptions in the power supply rails and by using special cells defined in the one or more standard cell libraries. Moreover, the process 900 may be configured to employ the PNR tool so as to maintain a gap between the power supply rails of the standard cells when connected to different power supply nets.

In various implementations, the special cells may refer to and/or be defined as a no-power cell having a first edge-type of the edge-types that defines a no-power edge-type, and also, the no-power cell may be configured to provide no available power connection to the power supply rails of the power supply net. Also, the special cells may refer to and/or be defined as an extend-power cell having a second edge-type of the edge-types that defines an extend-power edge-type, and also, the extend-power cell may be configured to provide an extended power supply rail that is selectively connectible to the power supply rail of an adjacent standard cell. Moreover, the special cells may refer to and/or be defined as a power-gap cell having a third edge-type of the edge-types that defines a power-gap edge-type, and also, the power-gap cell may be configured to provide an interrupted power rail with a gapped spatial interval that allows different segments of the interrupted power rail of the power-gap cell to be selectively connected to different power supply nets.

At block 934, process 900 may provide a physical layout of a design block having standard cells synthesized by the synthesis tool and placed by the PNR tool. For instance, in reference to FIGS. 3A-7E, the physical layout of the design block may refer to a device having a cell architecture with backside power rails. In this instance, the device may include an array of standard cells arranged in a stack of multiple rows including an upper row, one or more interior rows and a lower row, wherein each standard cell has a cell architecture with configurable power supply rails, and wherein each row of the multiple rows has multiple rail positions for the configurable power supply rails. The configurable power supply rails may include an upper rail position for an upper configurable power supply rail that is shared between upper-adjacent standard cells in an upper-adjacent row for one or more interior rows, or that is disposed at an upper outside edge of the array for the upper row. Also, the configurable power supply rails may include a lower rail position for a lower configurable power supply rail that is shared between lower-adjacent standard cells in a lower-adjacent row, or that is disposed at lower outside edge of the array for the lower row.

In some implementations, the configurable power supply rails may be coupled to a primary power supply and/or a primary ground supply in an alternating configuration. Also, at least one other configurable power supply rail for each standard cell may be configured as a removed rail, as a single segmented rail, and/or as a multi-segmented rail. The removed rail may refer to absence of the configurable supply rail in one or more of the multiple rail positions, and the single segmented rail refers to presence of a single segmented supply rail in one or more of the multiple rail positions that is coupled to a primary power supply, coupled to a secondary power supply, or unconnected to any power supply. The multi-segmented rail may refer to multiple segments that are separated with gapped spatial intervals so as to provide interruption between different rail segments that are coupled to the primary power supply, coupled to the secondary power supply, or unconnected to any power supply. Also, in reference to a multi-row, single-segmented configuration, at least one configurable power supply rail of each standard cell is coupled to a primary power supply or a secondary power supply or unconnected to any power supply. Moreover, in reference to a multi-row, multi-segmented configuration, at least one configurable power supply rail for each standard cell may be coupled to the primary power supply or the secondary power supply or unconnected to any power supply.

In some instances, in reference to FIGS. 7A-7E, the physical layout of the design block may refer to a device having special cells to complement area efficient cell design. In this instance, the device may include a multi-cell architecture having multiple cell structures of multiple cell types, wherein each cell structure has a backside power distribution network with backside power rails arranged in the multiple cell types, and wherein each cell structure may include a grounded edge and/or a configured edge that provides a non-powered edge, an extended-power edge, or a powered edge with an interruption. Also, each cell structure may include the backside power distribution network with the backside power rails arranged in the multiple cell types so as to provide at least one of a primary power supply, a secondary power supply or ground. The multiple cell types may have a first cell type with the grounded edge coupled to ground and the configured edge that provides the non-powered edge. The multiple cell types may have a second cell type with the grounded edge coupled to ground and the configured edge that provides the extend-power edge coupled to the primary power supply or the secondary power supply. The multiple cell types may have a third cell type with the grounded edge coupled to ground and the configured edge that provides the powered edge coupled to the primary power supply or the secondary power supply, and the powered edge may have an interruption with another non-powered edge inserted in the gapped spatial interval provided by the interruption.

Figure 10:
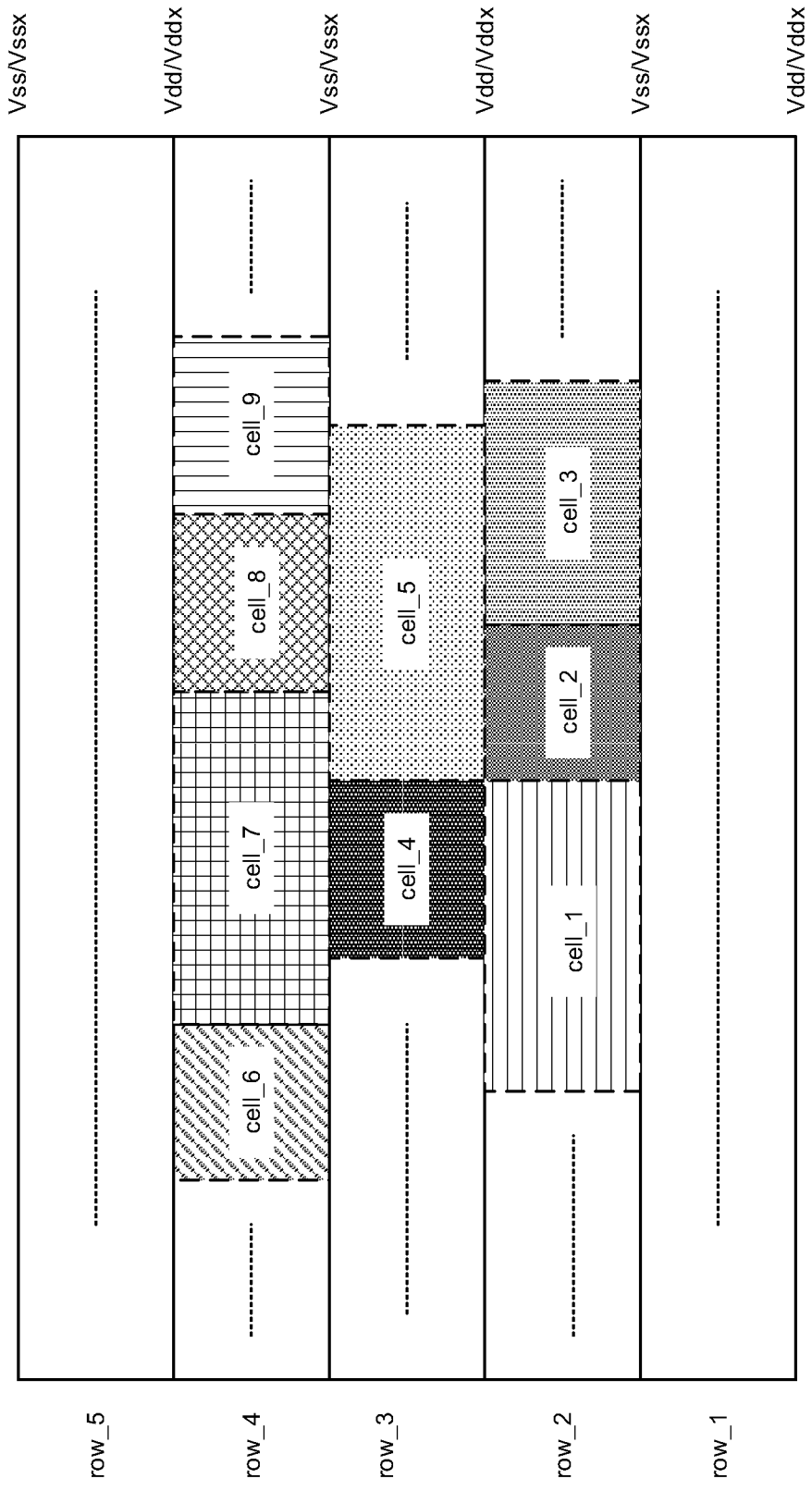
FIG. 10 illustrates a diagram of a standard cell design placement in accordance with various implementations described herein.

FIG. 10 illustrates a diagram 1000 of a standard cell design placement 1004 for a physical cell design in accordance with various implementations described herein. In some instances, the standard cell design placement 1004 may refer to a collection of area efficient cells in a physical layout design that characterize, define and/or build area efficient standard cell blocks so as to thereby support a backside power distribution network (BPDN). Further, FIG. 10 provides a diagram showing standard cells placed in a physical layout design.

As shown in FIG. 10, the standard cell design placement 1004 may include a number (N) of standard cells (e.g., cell_1, cell_2, . . . , cell_9) that are disposed in a number (N) of rows (e.g., row_1, row_2, . . . , row_5). Also, the standard cell design placement 1004 may include various power supply rails (e.g., Vdd/Vddx and/or Vss/Vssx) that are disposed between the standard cells (e.g., cell_1, cell_2, . . . , cell_9) along the length of each row (e.g., row_1, row_2, . . . , row_5). In some implementations, a first row (row_1) may not have any cells disposed therein, and a second row (row_2) may have multiple cells (3 cells: cell_1, cell_2, cell_3) that are disposed adjacent to each other so as to abut each other across the second row (row_2). Also, a third row (row_3) may have multiple cells (2 cells: cell_5, cell_6) that are disposed adjacent to each other so as to abut each other across the third row (row_3). Also, a fourth row (row_4) may have multiple cells (4 cells: cell_6, cell_7, cell_8, cell_9) that are disposed adjacent to each other so as to abut each other across the fourth row (row_4). Also, a fifth row (row_5) may not have any cells disposed therein.

In reference to FIGS. 9-10, various schemes and techniques described herein may provide a computer implemented algorithm to synthesize and place-and-route standard cells with electrically isolated structures in an area efficient manner, and electrically isolated structures may refer to power rails and NWELLs. The schemes and techniques described herein may be used in semiconductor manufacturing processes that enable backside power delivery with backside power rails and/or backside signal rails. In some implementations, the schemes and techniques described herein employ a synthesis tool to synthesize RTL using standard cell libraries having specially designed cells that do not carry area overhead for the electrically isolated structures, such as, e.g., the secondary supply rails, in processes that support a BPDN with backside power rails, or isolated NWELLs, or secondary supply rails in a process that supports frontside power supply rails. Also, the synthesis tool may process information provided in standard cell libraries and design constraints, and the synthesis tool may consider standard cells that have electrically isolated structures and their impact on the area as a constraint. Further, these synthesized standard cells, when grouped together, may be beneficial in achieving an overall area efficient design.

In some implementations, during global placement, the place-and route (PNR) tool may be employed to define edge-types on the fly for each cell that has been synthesized to be placed in the design based on electrically isolated structures, which may refer to a power supply net that the power rails touch for a given edge of the cell, and the rail connectivity may be assigned to the correct power supply net. Global placement may also consider grouping cells with same edge-types as much as possible to minimize rail interruptions and to reduce area overhead that occurs with rail interruptions. In various implementations, edges of cells may refer be east/west/north/south (or left/right/top/bottom), and the power supply net refers to a power supply name of a design and not to a power rail name of a standard cell. In some instances, a standard cell may have a Vdd rail, but the Vdd rail of the same cell in different instances of a design (PNR block) may be coupled to one or more Vddx rails (e.g., Vdd1 or Vdd2) of the design. Thus, each instance of the same standard cell in the design may have different edge-types provided on the fly, because in the design, the Vdd rail of the standard cell may be coupled to Vdd1 or Vdd2.

In some implementations, during standard cell placement legalization, the place-and-route (PNR) tool may be employed to obtain standard cells having the same edge-type to be placed next to each other as much as possible in groups, while maintaining a minimum length rule for isolated power rail segments by using special cells in the standard cell library (NOPOWER cells, EXTENDPOWER cell and/or POWERGAP cells). The affinity of the same net rails is an important characteristic during the process of global placement and placement legalization. During standard cell placement legalization, the place-and-route (PNR) tool may be employed to place the standard cells in proper orientation based on the available primary supply rail segment in the cell. Alternatively, the PNR tool may be setup to accept a mapping for secondary supplies to the primary supply, and any secondary supply that is mapped to the primary supply may be placed on primary supply positions in the design. Also, during placement legalization, the PNR tool may be employed to maintain the edge-type rules and to provide the necessary gap between the power rails of cells in positions where the power rails are coupled to different power supply nets.

It should be intended that the subject matter recited in the claims not be limited to the implementations and illustrations provided herein, but include modified forms of those implementations including portions of implementations and combinations of various elements of different implementations in accordance with the claims. It should be appreciated that in development of any such implementation, as in any engineering or design project, numerous implementation-specific decisions may be made to achieve developers' specific goals, such as compliance with system-related and/or business related constraints, which may vary from one implementation to another. Also, it should be appreciated that such a development effort may be complex and time-consuming, but would nevertheless be a routine undertaking of design, fabrication, and/or manufacture for those of ordinary skill in the art having benefit of the various schemes and techniques described herein in reference to this disclosure.

Described herein are various implementations of a method. The method may include synthesizing standard cells for a physical design having a power supply net with power supply rails. The method may include employing a place-and-route tool so as to define edge-types for each standard cell of the standard cells in the physical design based on the power supply net and the power supply rails that touch at least one edge of each standard cell of the standard cells.

Described herein are various implementations of a device having an array of standard cells arranged in a stack of multiple rows including an upper row, one or more interior rows and a lower row. Also, each standard cell may have a cell architecture with configurable power supply rails, and each row of the multiple rows may have multiple rail positions for the configurable power supply rails. The multiple rail positions may include an upper rail position for an upper configurable power supply rail that is shared between upper-adjacent standard cells in an upper-adjacent row for the one or more interior rows, or that is disposed at an upper outside edge of the array for the upper row. The multiple rail positions may include a lower rail position for a lower configurable power supply rail that is shared between lower-adjacent standard cells in a lower-adjacent row, or that is disposed at lower outside edge of the array for the lower row.

Described herein are various implementations of a device having a multi-cell architecture having multiple cell structures of multiple cell types. Also, each cell structure may have a backside power distribution network with backside power rails arranged in the multiple cell types. Also, each cell structure may have a grounded edge and a configured edge that provides a non-powered edge, an extended-power edge and/or a powered edge with an interruption.

Reference has been made in detail to various implementations, examples of which are illustrated in the accompanying drawings and figures. In the detailed description provided herein, numerous specific details are set forth so as to provide a thorough understanding of the disclosure provided herein. However, various aspects of the disclosure provided herein may be practiced without these specific details and/or features. In some instances, various well-known methods, procedures, systems, components, circuits and/or networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device, comprising:
one or more cells having a backside power distribution network (BPDN) cell architecture comprising:
a first power rail coupled to a first power supply and comprising a first power rail segment configured to provide the first power supply to the one or more cells; and
a grounded power rail coupled to ground, wherein either the first power rail or the grounded power rail is configurable with a power rail interruption.

2. The device of claim 1, wherein the power rail interruption corresponds to a rail continuity break, and further comprising:
a second power rail coupled to a second power supply and comprising a second power rail segment that is configured to provide the second power supply to the one or more cells, wherein the second power segment is configured to be positioned in spatial intervals corresponding to the rail continuity break.

3. The device of claim 2, wherein:
the rail continuity break comprises a rail opening; and
at least one of the first, second, or grounded power rail is formed with the same or different backside metal layers (BML).

4. The device of claim 2, wherein:
the second power segment is configured to be positioned in the spatial intervals;
first and second rail openings are formed on opposing sides of the second power segment; and
the first and second power rails are arranged corresponding to a single-row or multi-row of cells, wherein the single-row of cells comprise placement restrictions on an upper edge, and wherein the multi-row of cells comprise no placement restrictions.

5. The device of claim 1, wherein the first power rail is arranged corresponding to a single row corresponding of cells, and wherein at least one of the one or more cells is configured with placement restrictions on east edges, west edges, and north edges.

6. The device of claim 2, wherein the first and second power rails are arranged corresponding to a multi-row of cells, wherein at least one of first or second rows of the multi-row of cells is configured to provide the second power supply to an inside edge of the one or more cells, and wherein a third row of the multi-row of cells is configured to provide the first power supply to an outside edge of the one or more cells.

7. The device of claim 2, wherein the first and second power rails are arranged corresponding to a multi-row of cells, and wherein at least one of first or second rows of the multi-row of cells is configured to provide the first power supply to an inside edge of the one or more cells, and wherein a third row of the multi-row of cells is configured to provide the second power supply to an outside edge of the one or more cells.

8. The device of claim 1, further comprising: a first cell boundary corresponding to one or more areas that define a first useful span of device (USOD), wherein the USOD is enclosed within the cell boundary.

9. The device of claim 2, wherein at least one of the first power rail or the grounded power rail is configured at least partially as a removed rail, as a single segmented rail, or as a multi-segmented rail.

10. The device of claim 9, wherein:
the removed rail refers to an absence of a configurable supply rail in one or more of the multiple rail positions;
the single segmented rail refers to presence of a single segmented supply rail in one or more of the multiple rail positions that is coupled to a primary power supply, coupled to a secondary power supply, or unconnected to any power supply; and
the multi-segmented rail refers to multiple segments that are separated with gapped spatial intervals so as to provide interruption between different rail segments that are coupled to a primary power supply, coupled to a secondary power supply, or unconnected to any power supply.

11. The device of claim 1, wherein the one or more cells having a backside power distribution network (BPDN) cell architecture comprise a multi-cell architecture having multiple cell structures of multiple cell types,
wherein each cell structure has a backside power distribution network with backside power rails arranged in the multiple cell types, and
wherein each cell structure has a grounded edge and a configured edge that provides a non-powered edge, an extended-power edge, or a powered edge with an interruption.

12. The device of claim 11, wherein:
each cell structure includes the backside power distribution network with the backside power rails arranged in the multiple cell types so as to provide at least one of the first power supply, a second power supply and the ground.

13. The device of claim 12, wherein the multiple cell types include:
a first cell type having the grounded edge coupled to the ground and the configured edge that provides the non-powered edge.

14. The device of claim 12, wherein the multiple cell types include:
a second cell type having the grounded edge coupled to the ground and the configured edge that provides the extended-power edge coupled to the primary power supply or the secondary power supply.

15. The device of claim 12, wherein the multiple cell types include:
a third cell type having the grounded edge coupled to the ground and the configured edge that provides the powered edge coupled to the primary power supply or the secondary power supply, and wherein the powered edge has an interruption with another non-powered edge inserted in the gapped spatial interval provided by the interruption.

16. The device of claim 1, wherein at least one of the one or more cells comprises a no power edge (NPE) cell type configured with no power rail in the first power rail segment and configured with an NPE edge and the grounded power rail.

17. The device of claim 1, wherein at least one of the one or more cells comprises an extended power edge (EXT) cell type configured with an un-named power rail (UPPR) in the first power rail segment associated with an EXT edge and the grounded power rail.

18. The device of claim 1,
wherein the one or more cells having a backside power distribution network (BPDN) cell architecture comprise a multi-cell architecture having multiple cell structures of multiple cell types, and
wherein the BPDN cell architecture comprises: a first row comprising of one or more of an extended power edge (EXT) cell type; a no power edge (NPE) cell type; and an un-named power rail (UPPR) cell type.

19. The device of claim 18, further comprising:
a segmented power rail is disposed between the grounded power rail, and an upper grounded power rail, wherein the grounded power rail comprises a lower grounded power rail.

20. The device of claim 19, wherein the segmented power rail segment comprises one or more of UNPR segments, no power (NP) segments, first power supply (PPWR) segments, and second power supply (SPWR) segments.

* * * * *